(12) United States Patent
Kumagai et al.

(10) Patent No.: US 10,298,312 B2
(45) Date of Patent: May 21, 2019

(54) WIRELESS BASE STATION AND TERMINAL, AND SYSTEM AND METHOD FOR WIRELESS COMMUNICATION

(71) Applicant: FUJITSU LIMITED, Kawasaki-shi, Kanagawa (JP)

(72) Inventors: Shinya Kumagai, Machida (JP); Takashi Seyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/860,867

(22) Filed: Jan. 3, 2018

(65) Prior Publication Data

US 2018/0205443 A1 Jul. 19, 2018

(30) Foreign Application Priority Data

Jan. 19, 2017 (JP) .................................. 2017-007436

(51) Int. Cl.
*H04L 1/02* (2006.01)
*H04B 7/06* (2006.01)
(Continued)

(52) U.S. Cl.
CPC ......... *H04B 7/0686* (2013.01); *H04B 7/0417* (2013.01); *H04B 7/0456* (2013.01);
(Continued)

(58) Field of Classification Search
CPC ....... H04L 1/06; H04L 1/0618; H04L 5/0048; H04B 7/0417; H04B 7/0617; H04W 16/28; H04W 72/042
(Continued)

(56) References Cited

U.S. PATENT DOCUMENTS

2008/0225788 A1* 9/2008 Inoue .................... H04L 1/0006
370/329
2013/0142160 A1 6/2013 Hoshino et al.
(Continued)

FOREIGN PATENT DOCUMENTS

JP 2015-513257 4/2015
JP 2015-164281 9/2015
(Continued)

OTHER PUBLICATIONS

Tatsunori Obara et al., "Joint Fixed Beamforming and Eigenmode Precoding for Super High Bit Rate Massive MIMO Systems Using Higher Frequency Bands", 2014 IEEE 25th International Symposium on Personal, Indoor and Mobile Radio Communications, Washington, D.C., USA, Sep. 2-5, 2014, pp. 607-611 (5 pages).
(Continued)

*Primary Examiner* — Khai Tran
(74) *Attorney, Agent, or Firm* — Fujitsu Patent Center

(57) ABSTRACT

There is provided a wireless base station that stores information on a plurality of different first precodings and information on a plurality of different reception weights; transmits, from antennas, a plurality of downlink reference signals, each of which is obtained by applying one of the first precodings; receives information on reception quality of the downlink reference signals from wireless terminals; selects at least one from the wireless terminals based on the information on reception quality; determines wireless resource allocation for allowing the selected wireless terminal to transmit an uplink reference signal; notifies the selected wireless terminal of the wireless resource allocation; and receives the uplink reference signal transmitted from the selected wireless terminal by applying each of the reception weights to the uplink reference signal.

5 Claims, 25 Drawing Sheets

(51) Int. Cl.
   *H04B 7/0456* (2017.01)
   *H04B 7/0417* (2017.01)
   *H04W 88/08* (2009.01)
   *H04W 72/04* (2009.01)

(52) U.S. Cl.
   CPC ......... *H04B 7/0695* (2013.01); *H04W 72/042* (2013.01); *H04W 88/08* (2013.01)

(58) Field of Classification Search
   USPC ........ 375/267, 130, 260, 295, 349; 342/373; 370/329
   See application file for complete search history.

(56) References Cited

U.S. PATENT DOCUMENTS

| | | | | |
|---|---|---|---|---|
| 2013/0315328 | A1* | 11/2013 | Liu | ............ H04B 7/0413 375/267 |
| 2014/0334564 | A1* | 11/2014 | Singh | ............ H04B 7/0413 375/267 |
| 2015/0016379 | A1 | 1/2015 | Nam et al. | |
| 2016/0345216 | A1 | 11/2016 | Kishiyama et al. | |
| 2017/0104517 | A1* | 4/2017 | Kakishima | ............ H04B 7/0456 |
| 2017/0111149 | A1* | 4/2017 | Kim | ............ H04B 7/0617 |

FOREIGN PATENT DOCUMENTS

| | | |
|---|---|---|
| WO | 2012-020552 | 2/2012 |
| WO | 2015-141066 | 9/2015 |

OTHER PUBLICATIONS

Shohei Yoshioka et al., "Optimization of Number of Beams for 5G Low-SHF-Band Massive MIMO with Digital Beamforming in View of Insertion Loss of Pilot Signals", The Institute of Electronics, Information and Communication Engineers, IEICE Technical Report, RCS2016-42, May 2016, pp. 101-106 (6 pages).

* cited by examiner

MODIFICATION

201a: REFERENCE TABLE

| BEAM NUMBER | RSRP | | |
|---|---|---|---|
| | LOW ($p<th_1$) | INTERMEDIATE ($th_1 \leq p<th_2$) | HIGH ($p \geq th_2$) |
| #1 | Res#A | Res#B | Res#C |
| #2 | Res#D | Res#E | Res#F |
| ⋮ | ⋮ | ⋮ | ⋮ |
| #M | Res#A | Res#B | Res#C |

WIRELESS BASE STATION AND TERMINAL, AND SYSTEM AND METHOD FOR WIRELESS COMMUNICATION

CROSS-REFERENCE TO RELATED APPLICATION

This application is based upon and claims the benefit of priority of the prior Japanese Patent Application No. 2017-007436, filed on Jan. 19, 2017, the entire contents of which are incorporated herein by reference.

FIELD

The embodiments discussed herein are related to a wireless base station and terminal, and a system and method for wireless communication.

BACKGROUND

Massive Multiple-Input Multiple-Output (MIMO) with the number of antenna elements at a base station being increased by an order of magnitude, from hundreds to thousands, is known as a technology that offers ultra-wideband transmission at a high frequency range. In the case of implementing data stream separation and beam control by digital signal processing (digital precoding) in the baseband domain, load involved in matrix operation increases in proportion to the number of antenna elements. On the other hand, load of the matrix operation is reduced by adopting hybrid beamforming (BF) that combines analog beamforming for controlling beam directions in the radio frequency (RF) domain and digital precoding for separating data streams.

For this reason, the application of hybrid beamforming to base stations with Massive MIMO has been examined. Now let H denote a channel matrix representing the channel state between a base station and a terminal; W denote an analog beamforming matrix representing effects caused by analog beamforming; and P denote a digital precoding matrix representing effects caused by digital precoding. A signal vector r received at the terminal is expressed by the following Equation (1), where d and z denote a transmitted signal vector and a noise vector, respectively.

$$r = HWPd + z \quad (1)$$

In order to achieve hybrid beamforming that adequately compensates path-loss, the base station appropriately sets the analog beamforming matrix W and implements a process of estimating HW (explicit CSI (channel state information)) that reflects the analog beamforming and the channel state. In setting the analog beamforming matrix W, the base station finely controls the beam directions and obtains feedback on reception quality from the terminal for each of a large number of beam directions. Then, based on the reception quality fed back thereto, the base station determines the analog beamforming matrix W to be used for data transmission.

After determining the analog beamforming matrix W, the base station transmits reference signals to all terminals using the determined analog beamforming matrix W. Upon receiving the reference signals, the terminals individually generate explicit CSI estimate values based on the received reference signals and then feed the generated estimate values back to the base station. Using the estimate values fed back from all the terminals, the base station calculates the digital precoding matrix P. Then, the base station transmits data using the determined analog beamforming matrix W and the calculated digital precoding matrix P.

Japanese Laid-open Patent Publication No. 2015-164281
International Publication Pamphlet No. WO 2015141066
Japanese National Publication of International Patent Application No. 2015-513257
T. Obara, S. Suyama, J. Shen, and Y. Okumura, "Joint Fixed Beamforming and Eigenmode Precoding for Super High Bit Rate Massive MIMO Systems Using Higher Frequency Bands", Proceedings of 2014 IEEE 25th Annual International Symposium on Personal, Indoor, and Mobile Radio Communication, Washington D.C., US, September 2014.
Yoshioka, Suyama, Obara, Okuyama, Mashino, and Okumura, "Optimization of Number of Beams for 5G Low-SHF-BAND Massive MIMO with Digital Beamforming in View of Insertion Loss of Pilot Signals", IEICE (the Institute of Electronics, Information and Communication Engineers) technical report, RCS2016-42.

According to the above-described method, in order to implement hybrid beamforming, transmission and reception of the reference signals and the subsequent feedback between the base station and all the terminals take place over and over for each of the large number of beam directions. A large number of beam directions needed to be considered and the presence of a large number of terminals reduce communication efficiency.

SUMMARY

According to an aspect, there is provided a wireless base station including a storing unit configured to store information on a plurality of different first precodings and information on a plurality of different reception weights; and a control unit configured to transmit, from a plurality of antennas, a plurality of downlink reference signals, each of which is obtained by applying one of the plurality of first precodings, receive information on reception quality of the plurality of downlink reference signals from a plurality of wireless terminals, select, based on the information on reception quality, at least one wireless terminal amongst the plurality of wireless terminals, determine wireless resource allocation for allowing the at least one wireless terminal to transmit an uplink reference signal, notify the at least one wireless terminal of the wireless resource allocation, and receive the uplink reference signal transmitted from the at least one wireless terminal by applying each of the plurality of reception weights to the uplink reference signal.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
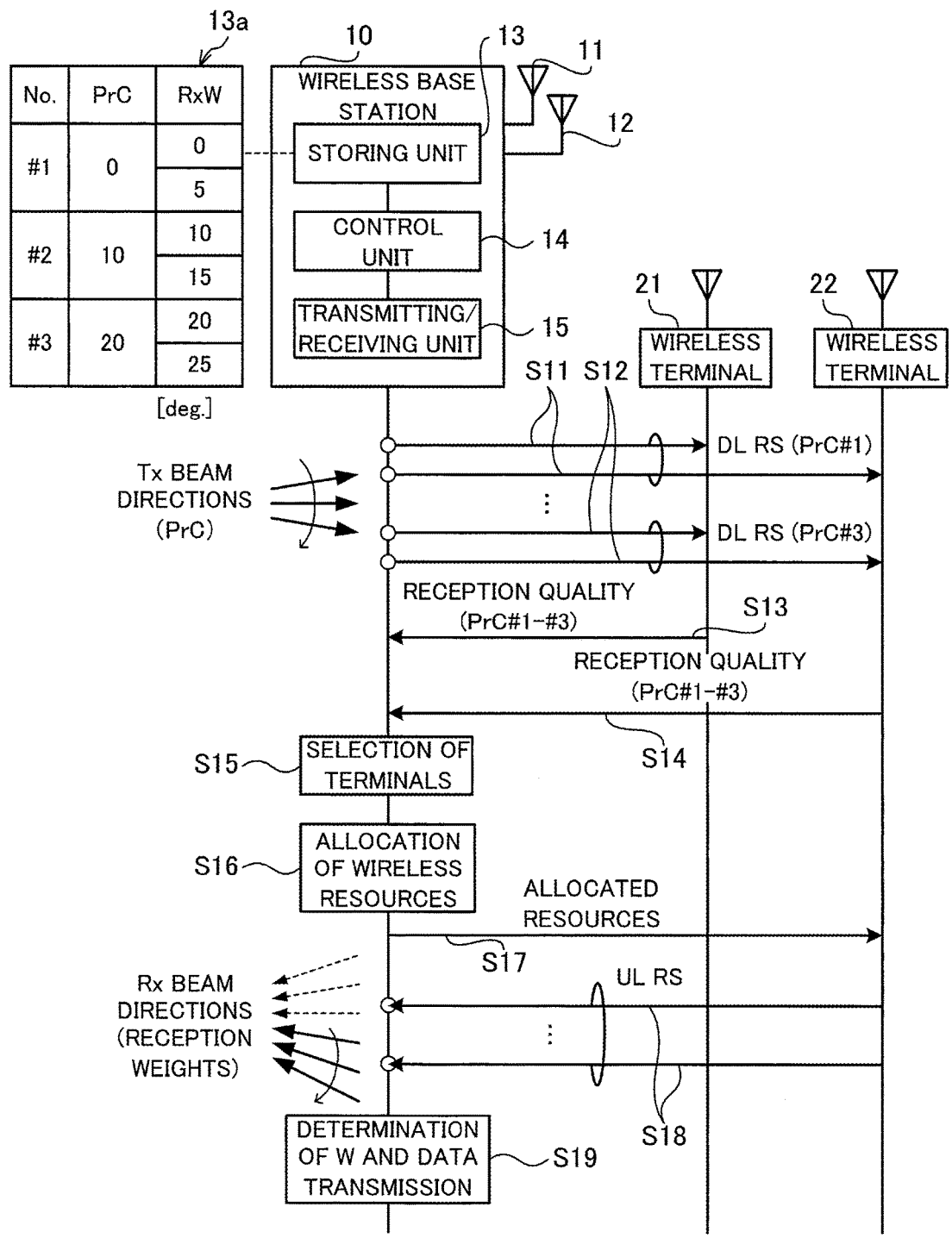
FIG. 1 illustrates an example of a wireless base station according to a first embodiment.

Several embodiments will be described below with reference to the accompanying drawings. In the following description and the accompanying drawings, like reference numerals refer to like elements having substantially the same functions, and a repeated description thereof may be omitted.

(a) First Embodiment

A first embodiment is described next with reference to FIG. 1. The first embodiment is directed to a method of efficiently acquiring information needed by a wireless base station implementing hybrid beamforming to determine precoding used in data transmission. FIG. 1 illustrates an example of the wireless base station according to the first embodiment. Note that a wireless base station 10 of FIG. 1 is an example of the wireless base station according to the first embodiment.

As illustrated in FIG. 1, the wireless base station 10 includes antennas 11 and 12, a storing unit 13, a control unit 14, and a transmitting/receiving unit 15. Note that the wireless base station 10 communicates with wireless terminals 21 and 22 by employing Time Division Duplex (TDD). The storing unit 13 is a storage device, such as random access memory (RAM), a hard disk drive (HDD), or flash memory. The control unit 14 is a processor such as a central processing unit (CPU), a digital signal processor (DSP), an application specific integrated circuit (ASIC), or a field programmable gate array (FPGA). The control unit 14 may execute programs stored, for example, in the storing unit 13.

The transmitting/receiving unit 15 converts digital signals in the baseband (baseband signals) into analog signals, converts the analog signals into signals in a radio frequency band (radio frequency signals), then performs analog beamforming (transmission beamforming) on the radio frequency signals, and transmits the resultant signals from the antennas 11 and 12. The transmitting/receiving unit 15 also performs analog beamforming (reception beamforming) on radio frequency signals received via the antennas 11 and 12, converts the radio frequency signals after the reception beamforming into analog signals in the baseband, and converts the analog signals into digital to thereby generate baseband signals.

Next described are functions of the wireless base station 10, related to determination of precoding used in data transmission. The storing unit 13 stores therein information about a plurality of different first precodings PrC and information about a plurality of different reception weights RxW. Note that the transmission beamforming is an example of the first precodings PrC. Elements of an analog beamforming matrix used for the reception beamforming are an example of the reception weights RxW.

In the example of FIG. 1, the storing unit 13 stores therein beamforming information 13a. The beamforming information 13a indicates beam orientation directions set by the first precodings PrC and reception sensitivity orientation directions set by the reception weights RxW. The beamforming information 13a illustrated in FIG. 1 includes beam orientation directions (0, 10, and 20) corresponding to three different first precodings PrC (PrC#1, #2, and #3). The beamforming information 13a also includes reception sensitivity orientation directions (0, 5, 10, 15, 20, and 25) corresponding to six different reception weights RxW. Note that each orientation direction is expressed as an angular measure (in degrees) from a reference direction for the purpose of illustration.

The control unit 14 controls the transmitting/receiving unit 15 based on the beamforming information 13a of the storing unit 13 to thereby transmit, from the plurality of antennas 11 and 12, a plurality of downlink reference signals (DL RS) each obtained by applying one of the first precodings PrC. For example, the control unit 14 transmits a downlink reference signal using the first precoding PrC#1 (0 degrees) (step S11). The control unit 14 also transmits a downlink reference signal using the first precoding PrC#2 (10 degrees). The control unit 14 also transmits a downlink reference signal using the first precoding PrC#3 (20 degrees) (step S12). Note that the selection order of the first precodings PrC may be changed.

After receiving the downlink reference signals, the wireless terminal 21 transmits, to the wireless base station 10, information on the reception quality of the received downlink reference signals (for example, received power) (step S13). In this regard, the wireless terminal 21 transmits information on the reception quality associated with each of the first precodings PrC#1, #2, and #3 to the wireless base station 10. In like fashion, the wireless terminal 22 transmits, to the wireless base station 10, information on the reception quality of the received downlink reference signals with respect to the individual first precodings PrC#1, #2, and #3 (step S14).

The control unit 14 receives, from the wireless terminals 21 and 22, the information on the reception quality of the downlink reference signals. Then, based on this information, the control unit 14 selects at least one from the wireless terminals 21 and 22. For example, the control unit 14 selects a predetermined number (e.g. 1) of wireless terminals in descending order of the reception quality (step S15). Assume here that the wireless terminal 22 is selected.

The control unit 14 determines allocation of wireless resources to allow the selected at least one wireless terminal (the wireless terminal 22) to transmit uplink reference signals (UL RS) (step S16). For example, the control unit 14 identifies, amongst the first precodings PrC#1, #2, and #3, a predetermined number (e.g. 2) of first precodings PrC with which high reception quality is observed at the wireless terminal 22. Then, the control unit 14 determines, based on the beamforming information 13a, to allocate wireless resources in such a manner that the wireless terminal 22 transmits as many uplink reference signals as the number of reception weights RxW corresponding to the identified first precodings PrC.

Assume here that the first precodings PrC#2 and #3 are identified. In this case, four reception weights RxW corresponding to angles of 10, 15, 20, and 25 degrees are identified together with the first precodings PrC#2 and #3. The control unit 14 secures four sets of wireless resources in the time and frequency domains, and allocates the four sets of wireless resources to the wireless terminal 22 for transmission of uplink reference signals. In addition, the control unit 14 determines parameters, such as a cyclic shift and transmission frequency, according to an implementation state.

The control unit 14 notifies the at least one wireless terminal (the wireless terminal 22) of the wireless resource allocation (step S17). Upon receiving the notice, the wireless terminal 22 transmits uplink reference signals (UL RS) using the allocated wireless resources (step S18). In receiving the uplink reference signals transmitted from the at least one wireless terminal (the wireless terminal 22), the control unit 14 applies a plurality of reception weights RxW (the four reception weights RxW individually corresponding to the angles of 10, 15, 20, and 25 degrees in the above example) to the uplink reference signals.

The control unit 14 selects suitable reception weights RxW based on the reception quality of the uplink reference signals to which the reception weights RxW have been applied, and acquires explicit CSI corresponding to the selected reception weights RxW. The control unit 14 then calculates a digital precoding matrix P from the explicit CSI. The control unit 14 uses the digital precoding matrix P and the selected reception weights RxW for data transmission (step S19). Note that the selected reception weights RxW are used as the analog beamforming matrix W.

The distribution of the orientation directions corresponding to the reception weights RxW is set denser than the distribution of the orientation directions corresponding to the first precodings PrC, as described above. According to the beamforming information 13a of FIG. 1, the angle distribution of the first precodings PrC is half the density of that of the reception weights RxW.

The selection of wireless terminals in step S15 reduces the number of wireless terminals to which downlink reference signals are transmitted. In addition, uplink reference signals are received using a plurality of reception weights RxW with dense orientation directions, thus enabling highly accurate extraction of suitable orientation directions. Further, the calculation of explicit CSI takes place at the wireless base station 10, thus eliminating the need of feeding explicit CSI back to the wireless base station 10.

These lead to a reduction in communication load involved in transmitting and receiving downlink and uplink reference signals and communication load associated with explicit CSI feedback. In addition, because the number of wireless terminals is reduced in step S15, an increase in communication load is not significant when the number of reception weights RxW is increased, which contributes to highly accurate selection of reception weights RxW (analog beamforming weights) and explicit CSI estimation.

Note that, in the example of FIG. 1, the wireless terminals 21 and 22 feed the reception quality back when having completed reception of the downlink reference signals corresponding to all the first precodings PrC (PrC#1, #2, and #3); however, the feedback timing may be changed. For example, each time a downlink reference signal is received, the reception quality of the downlink reference signal may be fed back to the wireless base station 10.

The beamforming information 13a of FIG. 1 is merely an example, and the representation of the beamforming information 13a may be modified according to controllable beam directions and properties of antennas. The beam directions may be defined by azimuth and zenith angles $\varphi$ and $\theta$, for example. Such modifications are also well within the technical scope of the first embodiment. The first embodiment has been described thus far.

(b) Second Embodiment

A second embodiment is directed to a method for a base station implementing hybrid beamforming to efficiently acquire explicit CSI while reducing communication load and determine a suitable analog beamforming matrix W to be used in data transmission and reception.

[b-1. Wireless Communication System]

Next described is a wireless communication system according to the second embodiment.

(Example of Wireless Communication System)

Figure 2:
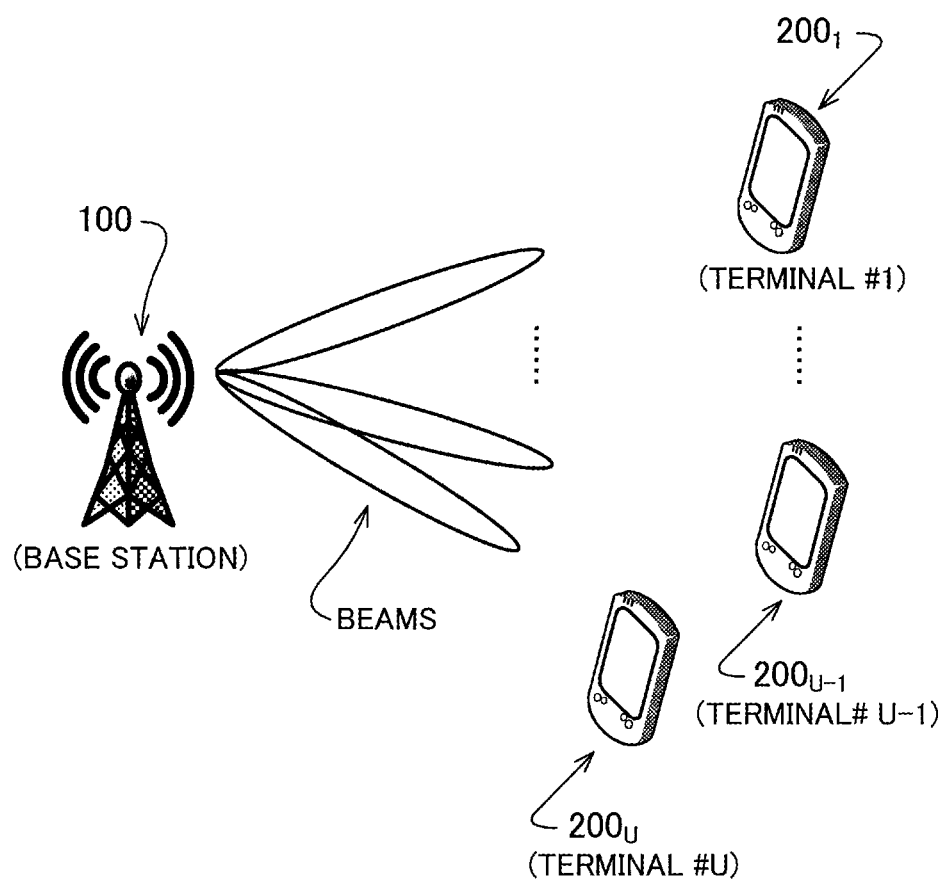
FIG. 2 illustrates an example of a wireless communication system according to a second embodiment.

FIG. 2 illustrates an example of the wireless communication system according to the second embodiment. As illustrated in FIG. 2, the wireless communication system includes a base station 100 and U terminals $200_1, \ldots, 200_U$ (U is an integer greater than or equal to 1). In the following, the terminals $200_1, \ldots, 200_U$ are sometimes referred to as "terminals #1, . . . , #U" for the purpose of illustration.

The base station 100 has a function of hybrid beamforming. For example, in transmitting L data streams (L is an integer greater than or equal to 2), the base station 100 performs, on the L data streams, digital precoding to reduce interference among the data streams. In addition, in transmitting data streams to particular terminals amongst the terminals $200_1, \ldots, 200_U$, the base station 100 employs analog beamforming to control beam directions so as to steer beams to the terminals.

The terminals $200_1, \ldots, 200_U$ are, for example, communication devices such as mobile phones, smartphones, and mobile routers, or information processors such as personal computers and car navigation systems equipped with a communication function. The terminals $200_1, \ldots, 200_U$ individually have a function of receiving downlink (DL) reference signals transmitted from the base station 100 and feeding reception quality (such as received power) of the received downlink reference signals back to the base station 100. In addition, the terminals $200_1, \ldots, 200_U$ individually have a function of transmitting uplink (UL) reference signals to the base station 100 at the request of the base station 100, using wireless resources allocated by the base station 100.

The following description is given based on the example of the wireless communication system of FIG. 2.

(Hardware)

Figure 3:
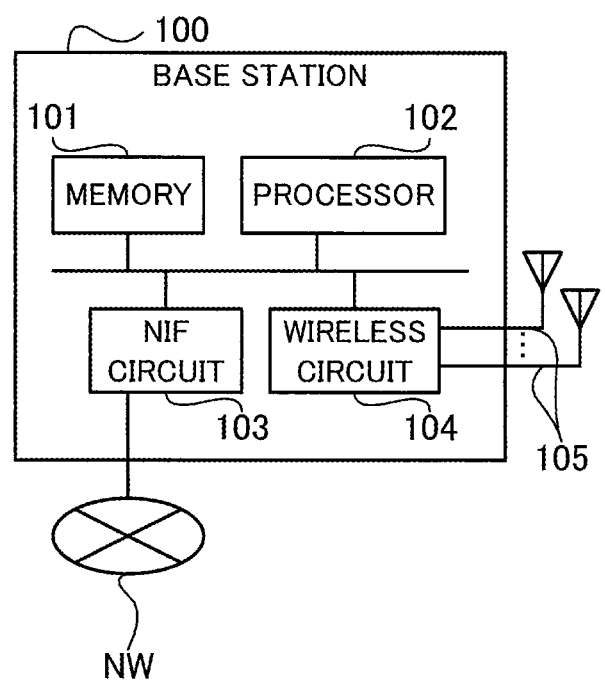
FIG. 3 is a block diagram illustrating an example of hardware capable of implementing functions of a base station according to the second embodiment.
Figure 4:
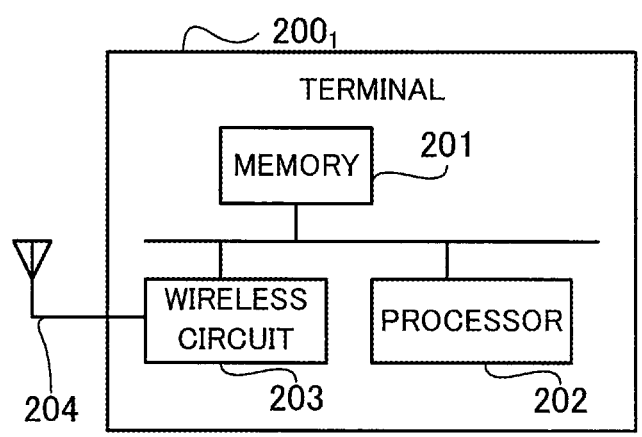
FIG. 4 is a block diagram illustrating an example of hardware capable of implementing functions of each terminal according to the second embodiment.

Next described is hardware of the base station 100 and the terminals $200_1, \ldots, 200_U$. FIG. 3 is a block diagram illustrating an example of hardware capable of implementing functions of the base station according to the second embodiment. FIG. 4 is a block diagram illustrating an example of hardware capable of implementing functions of each terminal according to the second embodiment.

(Base Station)

As illustrated in FIG. 3, the base station 100 includes memory 101, a processor 102, a network interface (NIF) circuit 103, a wireless circuit 104, and an antenna group 105. The memory 101 is a storage device, such as RAM, read only memory (ROM), a HDD, a solid state drive (SSD), or flash memory. The processor 102 is a processing circuit, such as a CPU, DSP, ASIC, or FPGA. The processor 102 performs, for example, digital signal processing for baseband signals and processing for controlling operations of the base station 100.

The NIF circuit 103 is a communication interface for communicating with other base stations, an administration station and the like through a wired network NW, such as a backbone network. The wireless circuit 104 includes a transmission circuit for generating radio frequency signals from baseband signals and transmitting the radio frequency signals via the antenna group 105. The wireless circuit 104 also includes a reception circuit for generating baseband signals from radio frequency signals received via the antenna group 105.

In the example of FIG. 3, the processor 102 implements digital precoding and the wireless circuit 104 implements analog beamforming. Note however that the hardware of FIG. 3 is only an example, and a circuit, such as a large-scale integration (LSI) circuit, for implementing part of the function of the processor 102 may be provided separately. The antenna group 105 includes n antenna elements (n is an integer greater than or equal to 2). In the following, the $k^{th}$ antenna element ($k=1, \ldots, n$) is sometimes denoted by $Ant_k$ for the purpose of illustration.

(Terminals)

As illustrated in FIG. 4, the terminal $200_1$ includes memory 201, a processor 202, a wireless circuit 203, and an antenna 204. Note that the functions of each of the terminals $200_2, \ldots, 200_U$ may be implemented using the same hardware as the terminal $200_1$ illustrated in FIG. 4. Therefore, as for the hardware of the terminals $200_2, \ldots, 200_U$, the detailed description is omitted.

The memory 201 is a storage device, such as RAM, ROM, a HDD, a SSD, or flash memory. The processor 202 is a processing circuit, such as a CPU, DSP, ASIC, or FPGA. The processor 202 performs, for example, digital signal processing for baseband signals and processing for controlling operations of the terminal $200_1$. The wireless circuit 203 includes a transmission circuit for generating radio frequency signals from baseband signals and transmitting the radio frequency signals via the antenna 204. The wireless circuit 203 also includes a reception circuit for generating baseband signals from radio frequency signals received via the antenna 204.

For example, the processor 202 controls the wireless circuit 203 to measure received power of each downlink reference signal received from the base station 100 and then generate a feedback (FB) signal used to feed information about the measured received power back to the base station 100. Subsequently, the processor 202 transmits the feedback signal to the base station 100 via the wireless circuit 203.

In addition, in the case of receiving notice of wireless resource allocation from the base station 100 and being asked for transmission of uplink reference signals, the processor 202 controls the wireless circuit 203 to transmit the uplink reference signals using the allocated wireless resources. Note that the hardware illustrated in FIG. 4 is only an example, and a circuit, such as an LSI circuit, for implementing part of the function of the processor 202 may be provided separately. In addition, the antenna 204 may be provided in plurality.

(Antenna Arrangement and Analog Beamforming)

Figure 5:
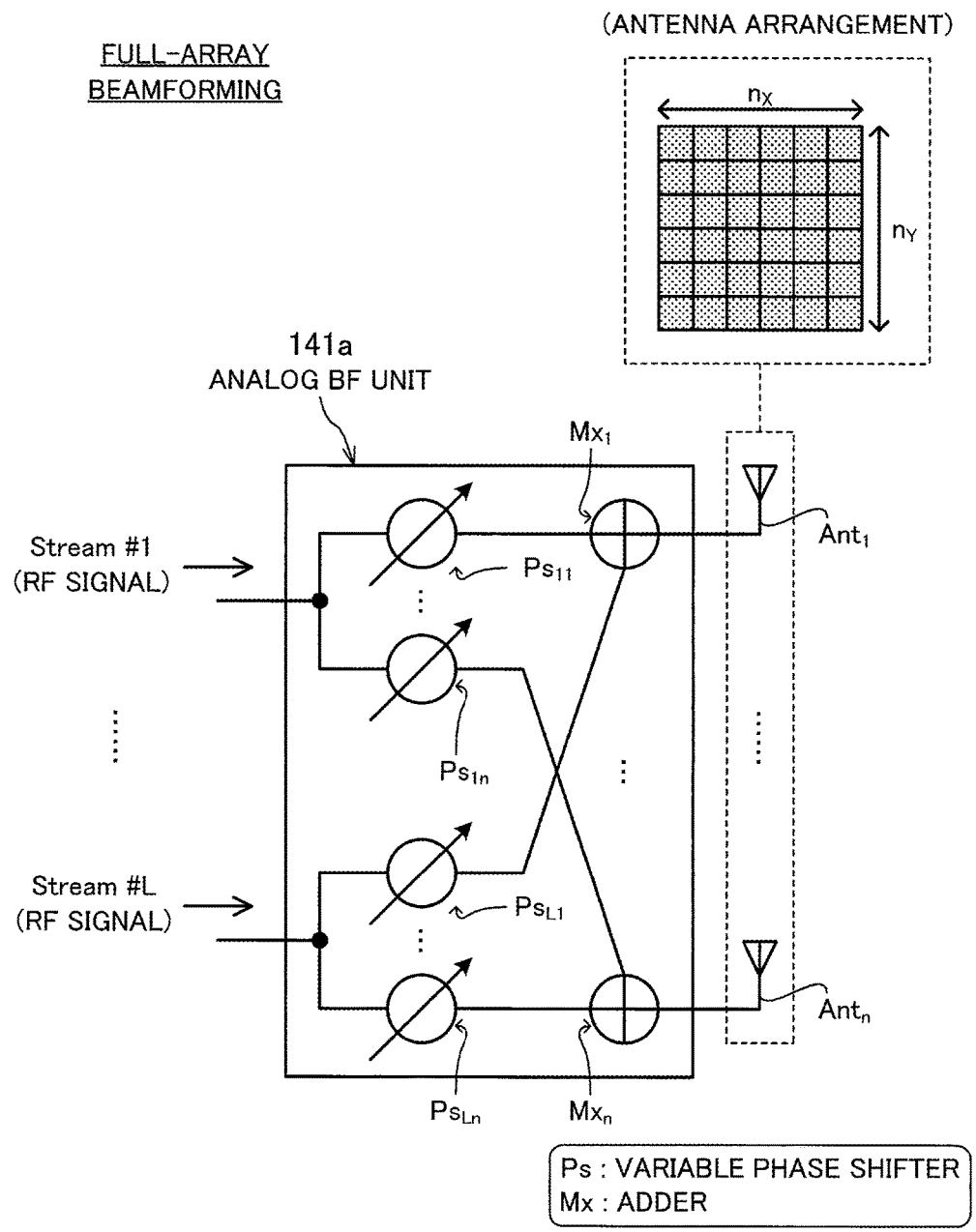
FIG. 5 illustrates full-array analog beamforming.
Figure 6:
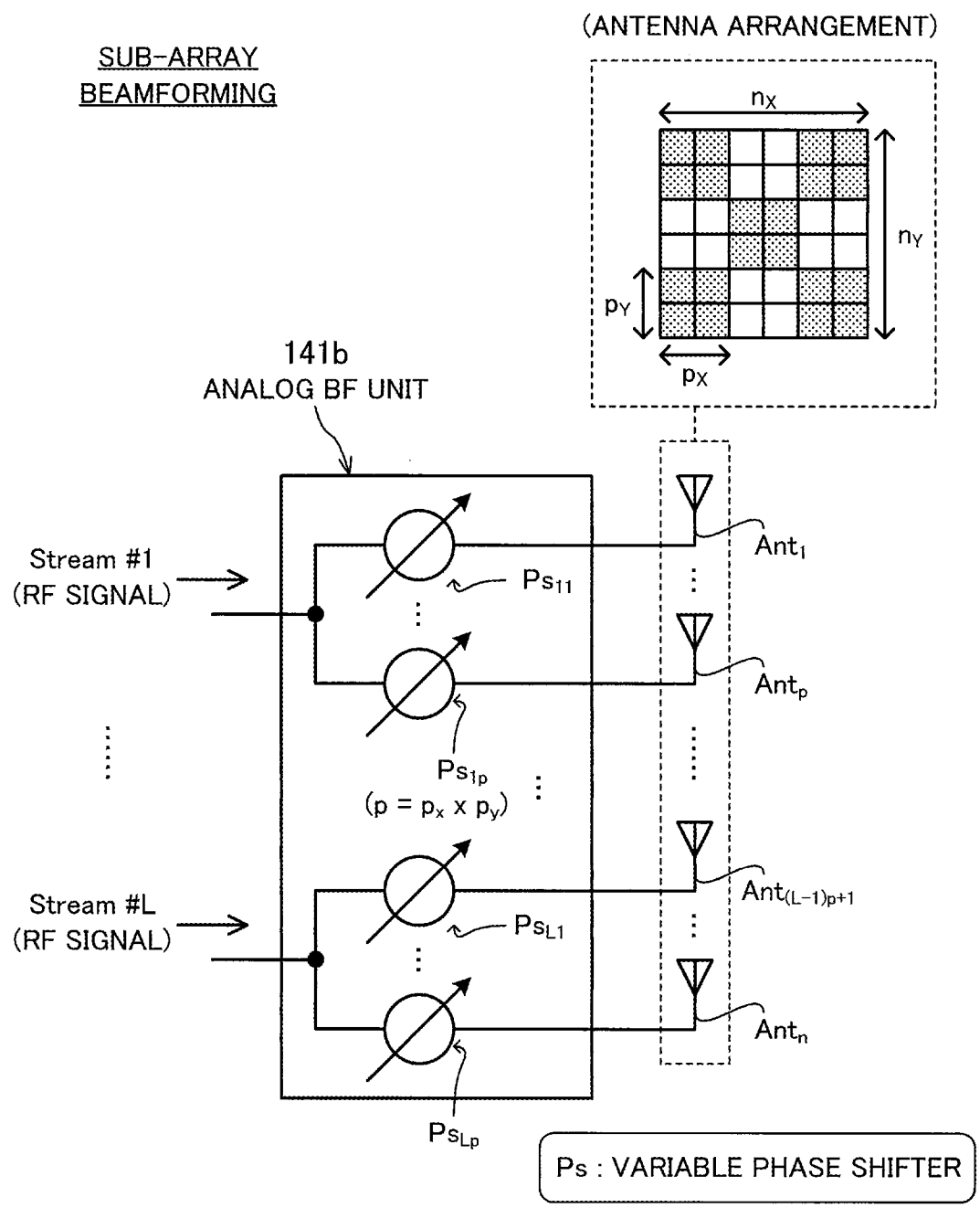
FIG. 6 illustrates sub-array analog beamforming.
Figure 7:
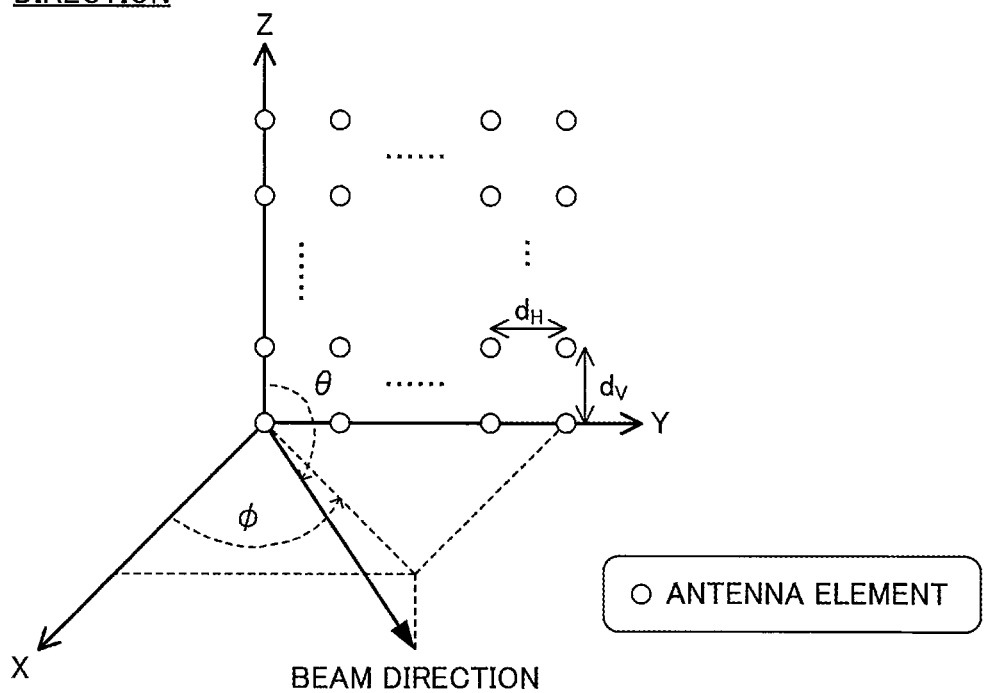
FIG. 7 illustrates control of beam directions in analog beamforming.

With reference to examples illustrated in FIGS. 5 to 7, next described are architectures of analog beamforming implemented by the wireless circuit 104. FIG. 5 illustrates full-array analog beamforming. FIG. 6 illustrates sub-array analog beamforming. FIG. 7 illustrates control of beam directions in analog beamforming.

(Full-Array Analog Beamforming)

There are two types of analog beamforming: full-array and sub-array. The full-array analog beamforming is a processing technique of beamforming using all n antenna elements ($n_X \times n_Y$ antenna elements in the example of FIG. 5), as illustrated in FIG. 5. A full-array analog beamforming unit 141a (a component of the wireless circuit 104, for implementing analog beamforming) includes n×L variable phase shifters $Ps_{11}, \ldots, Ps_{Ln}$ and n adders $Mx_1, \ldots, Mx_n$, as illustrated in FIG. 5.

For each value of a variable m ($m=1, \ldots, L$), a radio frequency signal corresponding to the $m^{th}$ data stream (Stream #m) is routed to n variable phase shifters $Ps_{m1}, \ldots, Ps_{mn}$. Each of the variable phase shifters $Ps_{m1}, \ldots, Ps_{mn}$ applies an analog beamforming weight (to be described later) to the radio frequency signal input thereto. Radio frequency signals output from the variable phase shifters $Ps_{m1}, \ldots, Ps_{mn}$ are input to the adders $Mx_1, \ldots, Mx_n$, respectively. Each adder $Mx_k$ adds radio frequency signals output from the variable phase shifter $Ps_{1k}, \ldots, Ps_{Lk}$ ($k=1, \ldots, n$). A radio frequency signal output from each adder $Mx_k$ is transmitted from a corresponding antenna $Ant_k$.

(Sub-Array Analog Beamforming)

On the other hand, the sub-array analog beamforming is a processing technique of dividing the n antenna elements into L blocks, or sub-arrays (each with the size of $p_X \times p_Y$ in the example of FIG. 6), and forming a beam for each of the sub-arrays, as illustrated in FIG. 6. A sub-array analog beamforming unit 141b (a component of the wireless circuit 104, for implementing analog beamforming) includes p×L variable phase shifters $Ps_{11}, \ldots, Ps_{Lp}$ ($p=p_x \times p_y$) as illustrated in FIG. 6.

For each value of the variable m ($m=1, \ldots, L$), a radio frequency signal corresponding to the $m^{th}$ data stream (Stream #m) is routed to p variable phase shifters $Ps_{m1}, \ldots, Ps_{mp}$. Each of the variable phase shifters $Ps_{m1}, \ldots, Ps_{mp}$ applies an analog beamforming weight (to be described later) to the radio frequency signal input thereto. Radio frequency signals individually output from the variable phase shifter $Ps_{m1}, \ldots, Ps_{mp}$ are transmitted from antennas $Ant_{(m-1)p+1}, \ldots, Ant_{mp}$, respectively.

(Analog Beamforming Weights)

Next described are analog beamforming weights with reference to FIG. 7. In the example of FIG. 7, n antenna elements (nV rows×nH columns) are arranged on a Y-Z plane. Specifically, the n antenna elements are arranged at intervals of $d_H$ in the Y direction and $d_V$ in the Z direction. In the case of steering a beam in a direction defined by an azimuth angle φ and a zenith angle θ using the n antenna elements, an analog beamforming weight $w_{k1}$ to be set for an antenna element at row k and column 1 (k=1, ..., $n_v$, l=1, ..., $n_H$) is given by the following Equation (2).

$$w_{k1} = \frac{1}{\sqrt{n_V n_H}} \exp\left[j\frac{2\pi}{\lambda}\{(1-1)d_V\cos\theta + (k-1)d_H\sin\theta\cos\phi\}\right] \quad (2)$$

($j$ is an imaginary unit)

In Equation (2), λ denotes the wavelength of radio waves. In the following, a vector w (the following Equation (3)) whose elements are analog beamforming weights is sometimes referred to as "analog beamforming vector". The description above is made in reference to the case of the full-array analog beamforming where beamforming is implemented using all the n antenna elements; however, the beam steering may also be achieved for the sub-array analog beamforming by the same method, using antenna elements belonging to sub-arrays.

$$w = [w_{11}, \ldots, w_{1N_V}, \ldots, w_{N_H 1}, \ldots, w_{N_H N_V}]^T \quad (3)$$

(Hybrid Beamforming)

Figure 8:
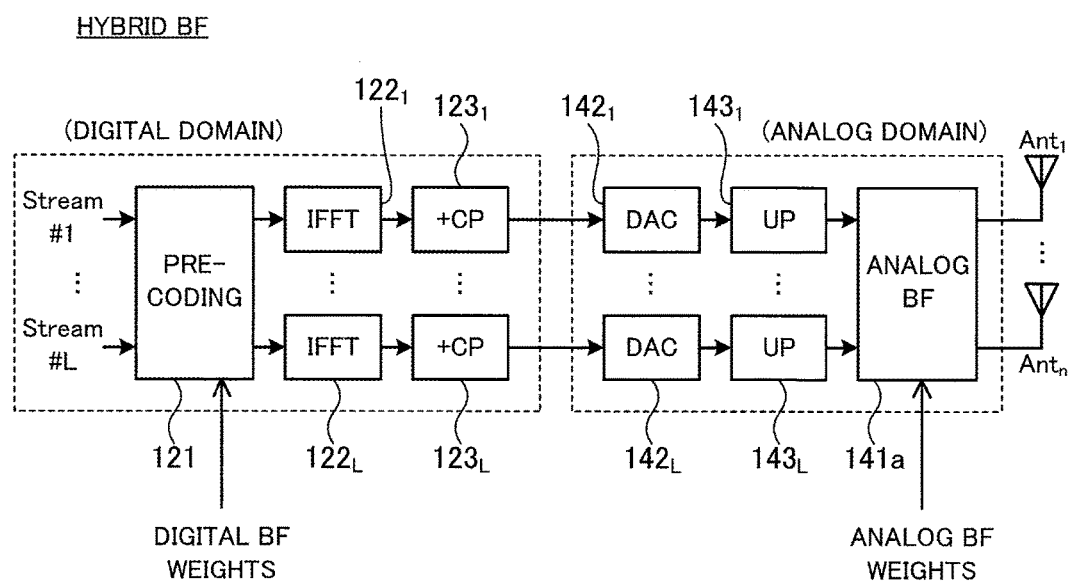
FIG. 8 is a block diagram illustrating an example of a transmitter of a base station employing hybrid beamforming.
Figure 9:
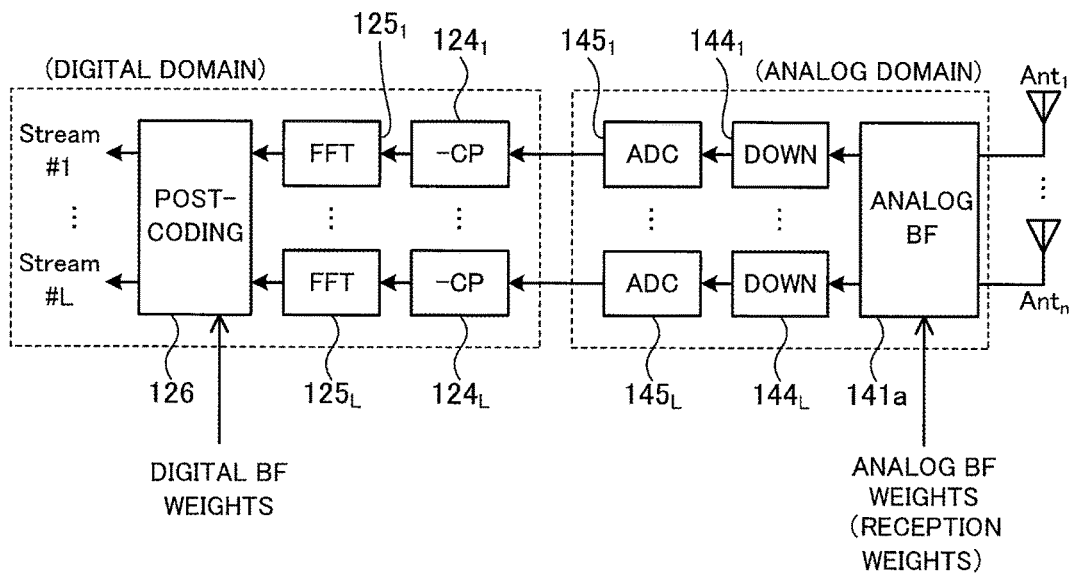
FIG. 9 is a block diagram illustrating an example of a receiver of the base station employing hybrid beamforming.

The wireless communication system according to the second embodiment employs hybrid beamforming that implements digital precoding in addition to the analog beamforming described above. Further explanation is given on the hybrid beamforming with reference to FIGS. 8 and 9. FIG. 8 is a block diagram illustrating an example of a transmitter of a base station employing hybrid beamforming. FIG. 9 is a block diagram illustrating an example of a receiver of the base station employing hybrid beamforming.

The hybrid beamforming is a processing technique of controlling beam directions in an analog domain using the above-described analog beamforming and separating data streams in a digital domain using digital precoding. Note that a process of separating data streams in the digital domain at the time of transmission is sometimes referred to as digital precoding while a process of separating data streams in the digital domain at the time of reception is sometimes referred to as digital postcoding. In the following, digital precoding and digital postcoding are sometimes referred to collectively as digital beamforming for the purpose of illustration.

The base station 100 has functions of a transmitter and receiver. Note that the functions of a transmitter and receiver are implemented using, for example, the processor 102 and the wireless circuit 104 above. For example, processing executed by the transmitter and receiver in the digital domain may be carried out by the processor 102. On the other hand, processing executed by the transmitter and receiver in the analog domain may be carried out by the wireless circuit 104.

(Transmitter)

As illustrated in FIG. 8, the transmitter includes, as components for executing processing in the digital domain, a precoding unit 121, inverse fast Fourier transform (IFFT) units $122_1, \ldots, 122_L$, and cyclic prefix (CP) adders (+CP) $123_1, \ldots, 123_L$. The transmitter also includes, as components for executing processing in the analog domain, digital-to-analog converters (DAC) $142_1, \ldots, 142_L$, up-converters (UP) $143_1, \ldots, 143_L$, and an analog beamforming unit 141a. The analog beamforming unit 141a corresponding to the full-array analog beamforming is used here as a component for executing an analog beamforming process for the purpose of illustration; however, the sub-array analog beamforming unit 141b may be used instead.

Digital beamforming weights calculated based on explicit CSI are set in the precoding unit 121. The precoding unit 121 multiplies baseband signals each corresponding to one of L data streams (Streams #1, ..., #L) by respective digital beamforming weights to thereby reduce interference among Streams #1, ..., #L (digital beamforming). The baseband signals corresponding to Streams #1, ..., #L are then input to the IFFT units $122_1, \ldots, 122_L$, respectively. Each of the IFFT units $122_1, \ldots, 122_L$ performs an inverse Fourier transform (IFFT) process on the input baseband signal. Outputs of the IFFT units $122_1, \ldots, 122_L$ are individually input to the cyclic prefix adders $123_1, \ldots, 123_L$. Each of the cyclic prefix adders $123_1, \ldots, 123_L$ adds a cyclic prefix to the baseband signal input thereto.

Outputs of the cyclic prefix adders $123_1, \ldots, 123_L$ are individually input to the DACs $142_1, \ldots, 142_L$. Each of the DACs $142_1, \ldots, 142_L$ converts the baseband signal in the digital domain input thereto into an analog signal. Outputs of the DACs $142_1, \ldots, 142_L$ are individually input to the up-converts $143_1, \ldots, 143_L$. Each of the up-converters $143_1, \ldots, 143_L$ converts the analog signal in the baseband input thereto into a radio frequency signal. Outputs of the up-converters $143_1, \ldots, 143_L$ are input to the analog beamforming unit 141a. The analog beamforming unit 141a multiplies the radio frequency signals by analog beamforming weights (see Equations (1) to (3) above) using the variable phase shifters $Ps_{11}, \ldots, Ps_{Ln}$ and the adders $Mx_1, \ldots, Mx_n$ of FIG. 5. Note that in the case of using the sub-array analog beamforming unit 141b in place of the analog beamforming unit 141a, multiplication of the radio frequency signals by the analog beamforming weights is performed by the variable phase shifters $Ps_{11}, \ldots, Ps_{Lp}$ illustrated in FIG. 6. Then, the radio frequency signals after the analog beamforming are transmitted via the antenna elements $Ant_1, \ldots, Ant_n$.

(Receiver)

As illustrated in FIG. 9, the receiver includes, as components for executing processing in the digital domain, cyclic prefix removers (−CP) $124_1, \ldots, 124_L$, fast Fourier transform (FFT) units $125_1, \ldots, 125_L$, and a postcoding unit 126. The receiver also includes, as components for executing processing in the analog domain, the analog beamforming unit 141a, down-converters (DOWN) $144_1, \ldots, 144_L$, and analog-to-digital converters (ADC) $145_1, \ldots, 145_L$. The analog beamforming unit 141a corresponding to the full-array analog beamforming is used here as a component for executing an analog beamforming process for the purpose of illustration; however, the sub-array analog beamforming unit 141b may be used instead.

Radio frequency signals are input to the analog beamforming unit 141a via the antenna elements $Ant_1, \ldots, Ant_n$. The analog beamforming unit 141a multiplies the radio frequency signals input thereto by respective corresponding analog beamforming weights to thereby control the beam directivity (a direction in which high reception sensitivity is observed). Outputs of the analog beamforming unit 141a corresponding to Streams #1, . . . , #L are input to the down-converter $144_1$, . . . , $144_L$, respectively.

Each of the down-converters $144_1$, . . . , $144_L$ converts the radio frequency signal input thereto into an analog signal in the baseband. Outputs of the down-converters $144_1$, . . . , $144_L$ are input to the ADCs $145_1$, . . . , $145_L$, respectively. Each of the ADCs $145_1$, . . . , $145_L$ converts the analog signal input thereto into a baseband signal in the digital domain. Outputs of the ADCs $145_1$, . . . , $145_L$ are input to the cyclic prefix removers $124_1$, . . . , $124_L$, respectively.

Each of the cyclic prefix removers $124_1$, . . . , $124_L$ removes cyclic prefixes added to the baseband signal input thereto. Outputs of the cyclic prefix removers $124_1$, . . . , $124_L$ are input to the FFT units $125_1$, . . . , $125_L$, respectively. Each of the FFT units $125_1$, . . . , $125_L$ performs a FFT process on the baseband signal input thereto. Outputs of the FFT units $125_1$, . . . , $125_L$ are all input to the postcoding unit 126.

Digital beamforming weights calculated based on explicit CSI are set in the postcoding unit 126. The postcoding unit 126 multiplies baseband signals each corresponding to one of Streams #1, . . . , #L by respective corresponding digital beamforming weights to thereby reduce interference among Streams #1, . . . , #L (digital beamforming).

As described above, the base station 100 implements, at the time of transmission and reception, the hybrid beamforming which is a combination of analog and digital beamforming. In order to adequately compensate path-loss by the hybrid beamforming, the base station 100 carries out selection of suitable analog beamforming weights (beam search) and estimation of explicit CSI (CSI estimation) based on results of the beam search. Further explanation is given below on the beam search and CSI estimation.

(Beam Search and CSI Estimation)

One method of beam search is, for example, to prepare a number of beam directions each defined by the azimuth angle φ and the zenith angle θ (see FIG. 7) and measure reception quality as switching the analog beamforming vector (see Equation (3) above) corresponding to each of the beam directions (comparative example). According to the comparative example, a combination of analog beamforming vectors corresponding to beam directions with high reception quality (the analog beamforming matrix W) fed back from terminals is selected. Then, each of the terminals performs CSI estimation using transmitted downlink reference signals to which the analog beamforming matrix W has been applied.

Figure 10:
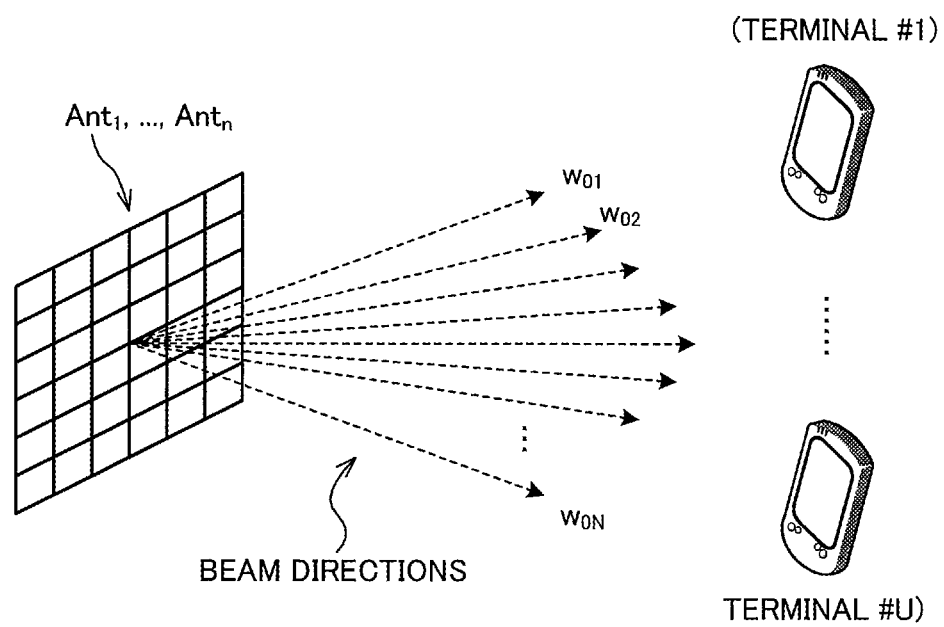
FIG. 10 is a first diagram illustrating a CSI estimation method of a comparative example.

For example, as illustrated in FIG. 10, a base station transmits downlink reference signals to terminals #1, . . . , #U as switching analog beamforming vectors $w_{O1}$, . . . , $w_{ON}$, and then selects the analog beamforming matrix W based on received power of the downlink reference signals, fed back from the individual terminals #1, . . . , #U. As for the analog beamforming vectors $w_{O1}$, . . . , $w_{ON}$, analog beamforming vectors corresponding to a plurality of beam directions are used, which beam directions are defined for each of the azimuth angle φ and the zenith angle θ, for example, by discretizing its 0-180 degree range into intervals of 5 degrees. FIG. 10 is a first diagram illustrating a CSI estimation method according to the comparative example.

Figure 11:
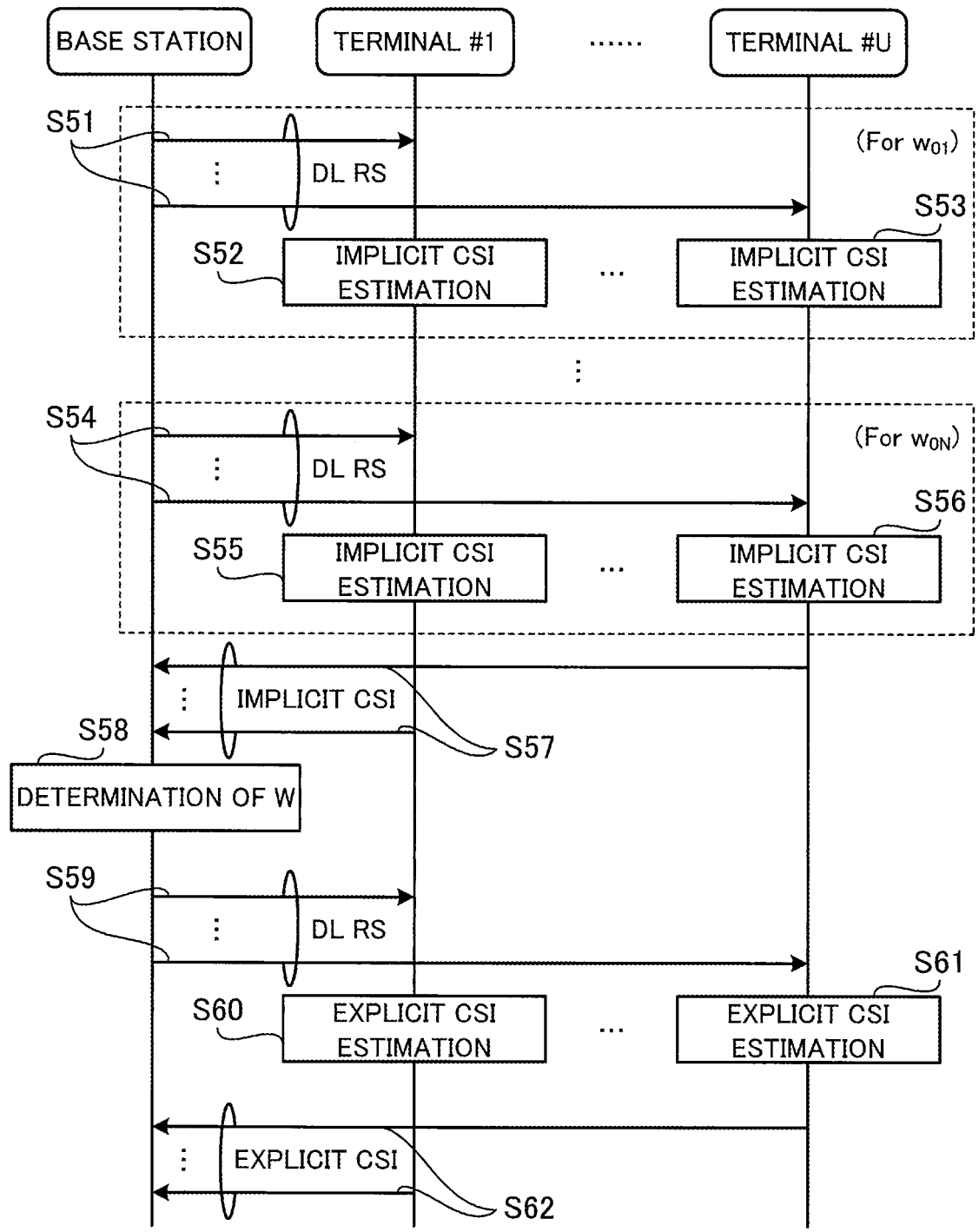
FIG. 11 is a second diagram illustrating the CSI estimation method of the comparative example.

FIG. 11 illustrates an example of the processing flow of the comparative example. FIG. 11 is a second diagram illustrating the CSI estimation method according to the comparative example.

(Steps S51 to S56) The base station transmits a downlink reference signal (DL RS) to all the terminals #1, . . . , #U using the analog beamforming vector $w_{O1}$. Upon receiving the downlink reference signal, the terminals #1, . . . , #U individually detect the received power of the downlink reference signal (implicit CSI estimation). Similarly, a downlink reference signal is transmitted to all the terminals #1, . . . , #U using each of the analog beamforming vectors $w_{O2}$, . . . , $w_{ON}$, and the terminals #1, . . . , #U individually perform implicit CSI estimation each time.

(Step S57) The terminals #1, . . . , #U individually feed results of the implicit CSI estimation (received power in this example) back to the base station.

(Step S58) Based on the results of the implicit CSI estimation fed back from the terminals #1, . . . , #U, the base station determines the analog beamforming matrix W. For example, the base station selects L analog beamforming vectors in descending order of received power and forms the analog beamforming matrix W using the selected L analog beamforming vectors.

(Step S59) The base station transmits downlink reference signals to all the terminals #1, . . . , #U using the analog beamforming matrix W determined in step S58.

(Steps S60 to S62) Each of the terminals #1, . . . , #U performs channel estimation based on the downlink reference signals received from the base station and calculates explicit CSI estimate values (explicit CSI estimation). Then, the terminals #1, . . . , #U individually feed the explicit CSI estimate values back to the base station.

According to the comparative example illustrated in FIGS. 10 and 11, the downlink reference signals are transmitted to all the terminals #1, . . . , #U as switching the preliminarily set N analog beamforming vectors, as described above. Discretizing the range for each of the azimuth angle φ and the zenith angle θ into fine divisions in order to improve performance for path-loss compensation leads to an increase in the number of analog beamforming vectors, N, which in turn increases the amount of wireless resources used for communicating the downlink reference signals and implicit CSI feedback.

In addition, each of the terminals #1, . . . , #U performing explicit CSI estimation results in an increase in processing load on the individual terminals #1, . . . , #U and therefore processing load on the entire wireless communication system including the terminals #1, . . . , #U. Furthermore, all the terminals #1, . . . , #U feeding explicit CSI back to the base station increases the amount of wireless resources used for communicating the explicit CSI feedback.

Figure 12:
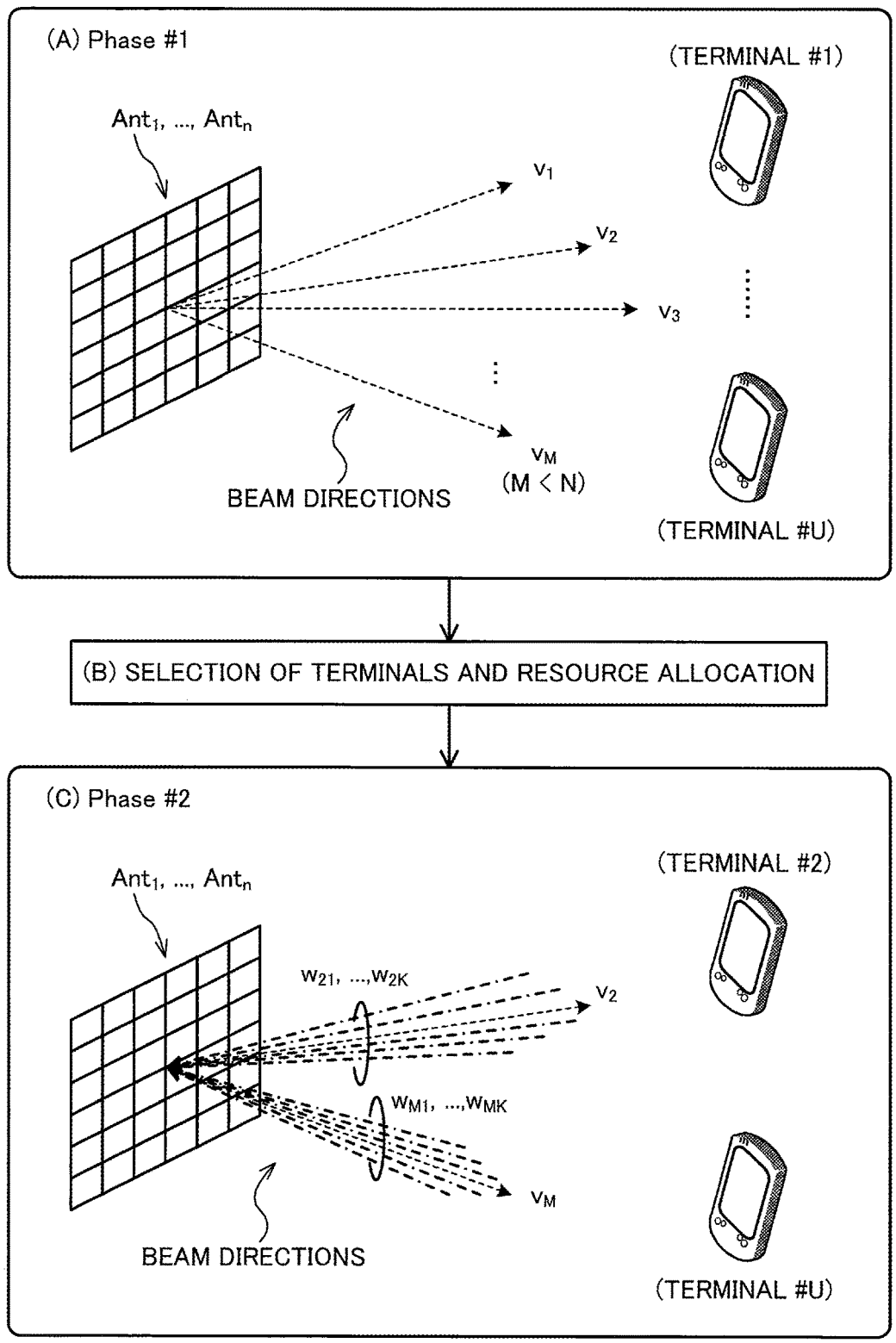
FIG. 12 illustrates a CSI estimation method according to the second embodiment.

Thus, the comparative example leaves the above-described problems unsolved and has room for improvement from the perspective of efficient use of wireless resources and load reduction on terminals. In view of this, the second embodiment improves communication efficiency by introducing an architecture illustrated in FIG. 12. FIG. 12 illustrates a CSI estimation method according to the second embodiment.

First, the base station 100 according to the second embodiment transmits downlink reference signals for implicit CSI estimation to all the terminals #1, . . . , #U (Phase 1), as illustrated in (A) of FIG. 12. At this time, the base station 100 uses a combination of beam directions defined for each of the azimuth angle φ and the zenith angle θ by discretizing its range into coarse divisions and transmits the downlink reference signals using analog beamforming vectors $v_1$, . . . , $v_M$ corresponding to M beam directions (M<N).

Note that the analog beamforming vectors $v_1, \ldots, v_M$ are given by the following Equation (4), as in the case of the analog beamforming vector w of Equation (3) above. Note however that elements (analog beamforming weights) $v_{mk1}$ of the analog beamforming vector $v_m$ (m=1, ..., M) are obtained by the following Equation (5). In Equation (5), $\lambda$ denotes the wavelength of radio waves.

$$V_m = [V_{m11}, \ldots, V_{m1N_V}, \ldots, V_{mN_H1}, \ldots, V_{mN_HN_V}]^T \quad (4)$$

$$v_{mk1} = \frac{1}{\sqrt{n_V n_H}} \exp\left[j\frac{2\pi}{\lambda}\{(1-1)d_V\cos\theta_m + (k-1)d_H\sin\theta_m\cos\phi_m\}\right] \quad (5)$$

($j$ is an imaginary unit)

Next, the base station 100 receives implicit CSI feedback from the terminals #1, ..., #U and selects, based on the implicit CSI, a set of terminals to be used for explicit CSI estimation, as illustrated in (B) of FIG. 12. For example, the base station 100 selects a predetermined number (for example, 2) of terminals with high reception quality based on the implicit CSI. Then, the base station 100 allocates wireless resources to each of the selected terminals, and transmits downlink control signals requesting transmission of uplink reference signals of a predetermined format (in terms of allocated resources (time and frequency), a cyclic shift, transmission frequency and the like).

Each of the terminals selected by the base station 100 (the terminals #2 and #U in the example of FIG. 12) transmits uplink reference signals of the predetermined format in response to the downlink control signals received from the base station 100. With respect to each of the selected terminals, the base station 100 sets beam directions with fine discretization based on a beam direction toward the terminal, as illustrated in (C) of FIG. 12, and then receives uplink reference signals using analog beamforming vectors corresponding to the set beam directions (Phase #2).

In the example of FIG. 12, beam directions with fine discretization are set based on a beam direction in which high reception quality has been observed at the terminal #2 (i.e., a beam direction corresponding to the analog beamforming vector $v_2$), and analog beamforming vectors $w_{21}, \ldots, w_{2K}$ corresponding to the set beam directions are used in reception beamforming for the uplink reference signals. In like fashion, beam directions with fine discretization are set based on a beam direction in which high reception quality has been observed at the terminal #U (i.e., a beam direction corresponding to the analog beamforming vector $v_M$), and analog beamforming vectors $w_{M1}, \ldots, w_{MK}$ corresponding to the set beam directions are used in reception beamforming for the uplink reference signals.

The base station 100 performs explicit CSI estimation based on the uplink reference signals after the reception beamforming. Using coarse discretization in Phase #1 where the downlink reference signals are transmitted to all the terminals #1, ..., #U, as described above, reduces the amount of wireless resources used for communicating the downlink reference signals and implicit CSI feedback compared to the comparative example.

In addition, reducing the number of terminals used for explicit CSI estimation curbs the amount of wireless resources used for communicating the downlink control signals and uplink reference signals. In addition, because the base station 100 carries out explicit CSI estimation, the terminals are relieved from the processing load. This allows even terminals with low processing power to be possibly subject to hybrid beamforming application. The second embodiment introduces the above-described architecture.

[b-2. Functions and Processing Flows]

The following offers further explanation of the functions and processing flows of the base station 100 and the terminals $200_1, \ldots, 200_U$ that implement the architecture described above.

(Base Station)

Figure 13:
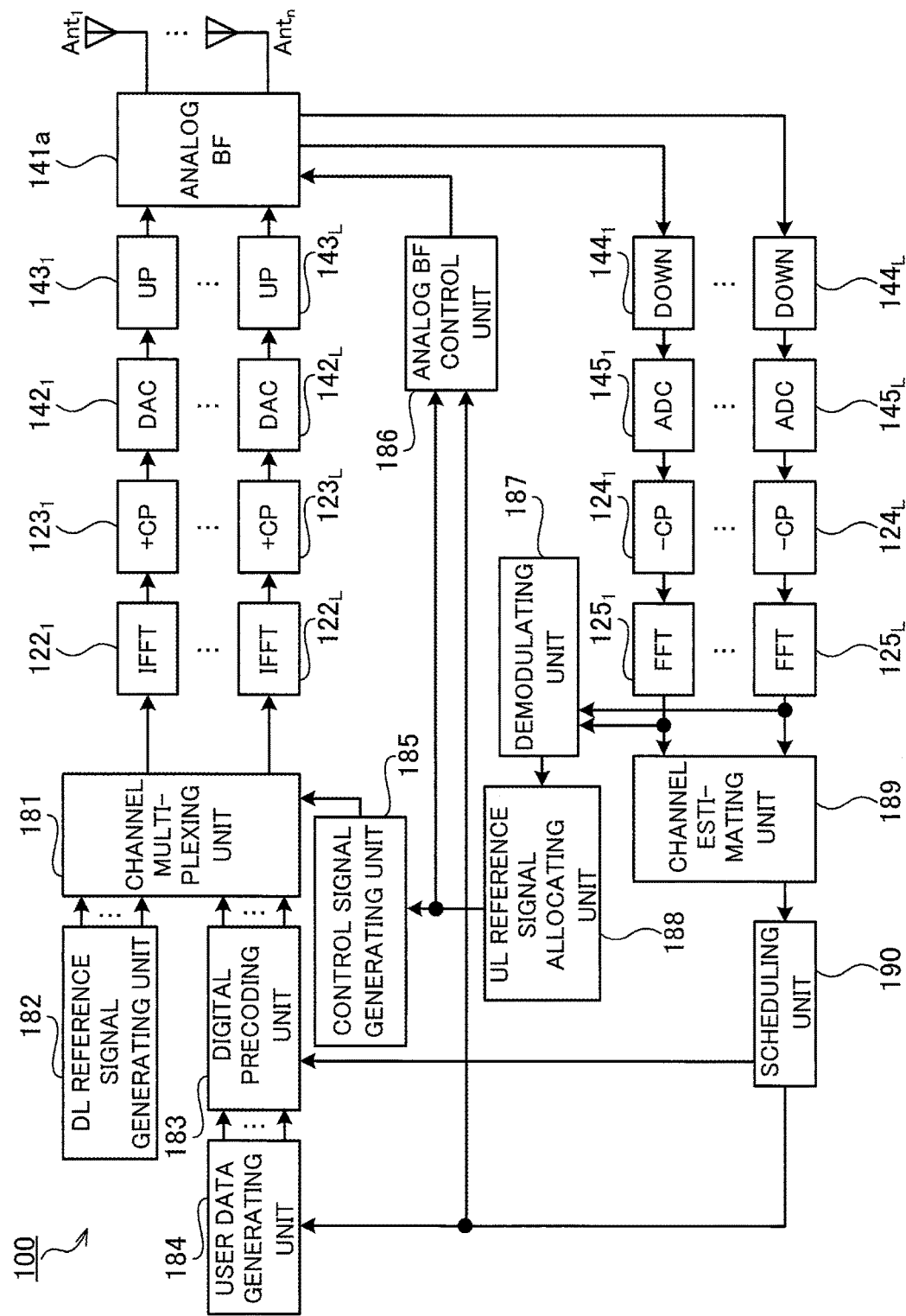
FIG. 13 is a block diagram illustrating an example of functions of the base station according to the second embodiment.

Let us refer to FIG. 13 which is a block diagram illustrating an example of functions of the base station according to the second embodiment. Note that the functions already explained with reference to FIGS. 8 and 9 are denoted by like reference numerals to avoid repeated description, and the detailed descriptions thereof may be omitted. As illustrated in FIG. 13, the base station 100 includes the IFFT units $122_1, \ldots, 122_L$, the cyclic prefix adders $123_1, \ldots, 123_L$, the cyclic prefix removers $124_1, \ldots, 124_L$, and the FFT units $125_1, \ldots, 125_L$. In addition, the base station 100 includes the analog beamforming unit 141a (the analog beamforming unit 141b in the case of sub-array analog beamforming), the DACs $142_1, \ldots, 142_L$, the up-converters $143_1, \ldots, 143_L$, the down-converters $144_1, \ldots, 144_L$, and the ADCs $145_1, \ldots, 145_L$.

The base station 100 also includes a channel multiplexing unit 181, a downlink reference signal generating unit 182, a digital precoding unit 183, a user data generating unit 184, and a control signal generating unit 185. In addition, the base station 100 includes an analog beamforming control unit 186, a demodulating unit 187, an uplink reference signal allocating unit 188, a channel estimating unit 189, and a scheduling unit 190.

Functions of the channel multiplexing unit 181, the downlink reference signal generating unit 182, the digital precoding unit 183, the user data generating unit 184, the control signal generating unit 185, and the analog beamforming control unit 186 may be implemented, for example, by the processor 102, or an LSI or the like provided separately. Similarly, functions of the demodulating unit 187, the uplink reference signal allocating unit 188, the channel estimating unit 189, and the scheduling unit 190 may be implemented, for example, by the processor 102, or an LSI or the like provided separately.

Next described is a processing flow carried out in the beam search and CSI estimation.

(Phase #1)

The downlink reference signal generating unit 182 generates downlink reference signals to be used by the terminals $200_1, \ldots, 200_U$ for implicit CSI estimation. The downlink reference signals generated by the downlink reference signal generating unit 182 are input to the channel multiplexing unit 181. The channel multiplexing unit 181 maps the downlink reference signals input thereto to subcarriers. An output of the channel multiplexing unit 181 is input to the individual IFFT units $122_1, \ldots, 122_L$.

The downlink reference signals are then converted by the IFFT units $122_1, \ldots, 122_L$ into useful symbols, to which cyclic prefixes are added by the cyclic prefix adders $123_1, \ldots, 123_L$ to thereby form orthogonal frequency division multiplexing (OFDM) symbols. Outputs of the cyclic prefix adders $123_1, \ldots, 123_L$ are input to the analog beamforming unit 141a via the DACs $142_1, \ldots, 142_L$ and the up-converters $143_1, \ldots, 143_L$. Under the control of the analog beamforming control unit 186, the analog beamforming unit 141a applies analog beamforming to radio frequency signals output from the up-converters $143_1, \ldots, 143_L$.

The analog beamforming control unit 186 controls the analog beamforming unit 141a in such a manner as to apply analog beamforming to the radio frequency signals as switching the analog beamforming vectors $v_1, \ldots, v_M$ based on the defined beam directions with coarse discretization, as illustrated in FIG. 12. As for the granularity of the discretization, in the case, for example, where beam directions are set in Phase #2 by discretizing the 0-180 degree range into intervals of 5 degrees, the discretization intervals in Phase #1 are set to 10 degrees, for example. Note however that the range need not be discretized into equal-angle intervals, and different granularities of discretization may be used for the azimuth angle $\varphi$ and the zenith angle $\theta$.

A wide beam is generated, for example, by feeding power only to some antenna elements in one area amongst a plurality of antenna elements and feeding no power to the remaining antenna elements. That is, the antenna aperture area (an area of a region including a set of antenna elements to compose a single antenna array) is controlled to be apparently small to thereby increase the beam width. Note that this control is equivalent to control of setting the analog beamforming weights of antenna elements in one area to non-zero while setting the analog beamforming weights of the remaining antenna elements to zero.

The analog beamforming control unit 186 calculates the analog beamforming vector $v_1$ based on the direction in which the beam is aimed (the azimuth angle $\varphi$ and the zenith angle $\theta$), and controls the analog beamforming unit 141a so as to apply the calculated analog beamforming vector $v_1$ to the radio frequency signals (the downlink reference signals). The analog beamforming unit 141a applies the analog beamforming vector $v_1$ to the downlink reference signals and then transmits the downlink reference signals from the antenna elements $Ant_1, \ldots, Ant_n$. In like fashion, the analog beamforming control unit 186 exercises control over the analog beamforming unit 141a with respect to each of the analog beamforming vectors $v_2, \ldots, v_M$.

(Phase #2)

The base station 100 receives feedback signals including implicit CSI statements from the terminals $200_1, \ldots, 200_U$. Note that reception beamforming may be set to be implemented when the feedback signals are received. The demodulating unit 187 demodulates the feedback signals received from the terminals $200_1, \ldots, 200_U$ and acquires the implicit CSI statements obtained by the individual terminals $200_1, \ldots, 200_U$. The implicit CSI statements acquired by the demodulating unit 187 are input to the uplink reference signal allocating unit 188.

Based on the implicit CSI statements, the uplink reference signal allocating unit 188 selects terminals to which wireless resources for transmission of uplink reference signals are to be allocated. At this time, the uplink reference signal allocating unit 188 selects, based on the implicit CSI statements, a predetermined number (for example, 2) of terminals with high downlink-reference-signal reception quality. For example, the uplink reference signal allocating unit 188 extracts each terminal with maximum received power obtained when the analog beamforming vector $v_q$ ($q= 1, \ldots, M$) is used, in association with its received power. Then, the uplink reference signal allocating unit 188 selects, amongst the extracted pairs of a terminal and its received power, the predetermined number of terminals in descending order of received power.

The uplink reference signal allocating unit 188 allocates wireless resources for transmission of uplink reference signals to the selected terminals. In the example of FIG. 12, the terminal #2 (the terminal $200_2$) and the terminal #U (the terminal $200_U$) are selected. At the terminal #2, the maximum received power is obtained when the analog beamforming vector $v_2$ is used. At the terminal #U, the maximum received power is obtained when the analog beamforming vector $v_M$ is used. In this case, the uplink reference signal allocating unit 188 allocates wireless resources to the terminals $200_2$ and $200_U$.

The wireless resources to be allocated to the selected terminals include, for example, time, frequency, codes, and cyclic shifts. Note however that the uplink reference signal allocating unit 188 may allocate, to the selected terminals, wireless resources that are mutually orthogonal to each other. As for terminals for which different analog beamforming weights are used, the same wireless resources may be allocated to them. In addition, the uplink reference signal allocating unit 188 may allocate wireless resources in such a manner as to allow each terminal to transmit uplink reference signals multiple times in order to improve real-time performance of channel estimation. Note that, in Phase #2, reception beamforming for uplink reference signals is implemented as switching a plurality of analog beamforming weights. Therefore, the uplink reference signal allocating unit 188 allocates wireless resources in such a manner that at least as many uplink reference signals as the number of beams K are to be transmitted. Note however that K may be common to all the terminals, or may vary from one terminal to another.

The control signal generating unit 185 generates downlink control signals requesting transmission of uplink reference signals to each of the terminals selected by the uplink reference signal allocating unit 188. The downlink control signals include information about the resource allocation for uplink reference signals. After being input to the channel multiplexing unit 181, the downlink control signals are converted into radio frequency signals via the communication paths to the analog beamforming unit 141a and then transmitted from the antenna elements $Ant_1, \ldots, Ant_n$.

Note that, in transmitting the downlink control signals, the analog beamforming unit 141a may implement transmission beamforming to thereby improve reception quality of the individual terminals selected by the uplink reference signal allocating unit 188. For example, in the case where the terminals $200_2$ and $200_U$ are selected and analog beamforming vectors maximizing received power at the terminals $200_2$ and $200_U$ are $v_2$ and $v_M$, respectively, the analog beamforming unit 141a may implement transmission beamforming using the analog beamforming vectors $v_2$ and $v_M$.

The base station 100 receives uplink reference signals from the selected terminals. In this regard, the analog beamforming control unit 186 controls the analog beamforming unit 141a to receive the uplink reference signals as implementing reception beamforming while switching a plurality of analog beamforming vectors corresponding to each group of beam directions with fine discretization. In the example of FIG. 12, based on the analog beamforming vectors $v_2$ and $v_M$ corresponding to the maximum received power observed at the selected terminals #2 and #U (the terminals $200_2$ and $200_U$), respectively, the analog beamforming vectors $w_{21}, \ldots, w_{2K}$, and $w_{M1}, \ldots, w_{MK}$ corresponding to individual groups of beam directions set at small angle intervals are applied in the reception beamforming.

As for the granularity of the discretization, in the case, for example, where beam directions are set in Phase #1 by discretizing the 0-180 degree range into intervals of 10 degrees, the discretization intervals in Phase #2 are set to 5 degrees, for example. Note however that the range need not be discretized into equal-angle intervals, and different granularities of discretization may be used for the azimuth angle $\varphi$ and the zenith angle $\theta$.

According to the example above, the analog beamforming control unit 186 calculates the analog beamforming vectors $w_{21}$ and $w_{M1}$, and controls the analog beamforming unit 141a to apply the analog beamforming vectors $w_{21}$ and $w_{M1}$ when uplink reference signals are received. In like fashion, the analog beamforming unit 141a is controlled based on the analog beamforming vectors $w_{22}, \ldots, w_{2K}$, and $w_{M2}, \ldots, w_{MK}$ calculated by the analog beamforming control unit 186, and reception beamforming is implemented when uplink reference signals are received.

After being output from the analog beamforming unit 141a, the uplink reference signals having undergone the reception beamforming are converted into digital signals in the baseband and then input to the channel estimating unit 189. The channel estimating unit 189 performs channel estimation based on the input digital signals and obtains explicit CSI. In the example of FIG. 12, the channel estimating unit 189 obtains explicit CSI corresponding to the individual analog beamforming vectors $w_{21}, \ldots, w_{2K}$, and $w_{M1}, \ldots, w_{MK}$.

The processing flow of selecting the terminals $200_2$ and $200_U$ and acquiring the explicit CSI is described above. Note here that the above process is repeatedly performed as changing a combination of terminals selected. In addition, the above process may be repeated for one combination of terminals more than once until desired explicit CSI is obtained.

After acquisition of the explicit CSI, the scheduling unit 190 selects terminals to which user data is to be transmitted and selects analog beamforming vectors used to transmit the user data. In this regard, the scheduling unit 190 selects analog beamforming vectors that, for example, improve the throughput for the combination of selected terminals or improve the orthogonality of channels among the selected terminals.

The user data generating unit 184 generates user data to be transmitted to the terminals selected by the scheduling unit 190. The user data generated by the user data generating unit 184 is input to the digital precoding unit 183. The digital precoding unit 183 carries out a digital precoding process using digital beamforming weights for reducing interference among data streams.

An output of the digital precoding unit 183 is input to the channel multiplexing unit 181 and then converted into radio frequency signals (data signals), which are then input to the analog beamforming unit 141a. Under the control of the analog beamforming control unit 186, the analog beamforming unit 141a multiplies the data signals by the analog beamforming vectors selected by the scheduling unit 190 and then transmits the resultant signals from the antenna elements $Ant_1, \ldots, Ant_n$.

(Terminals)

Figure 14:
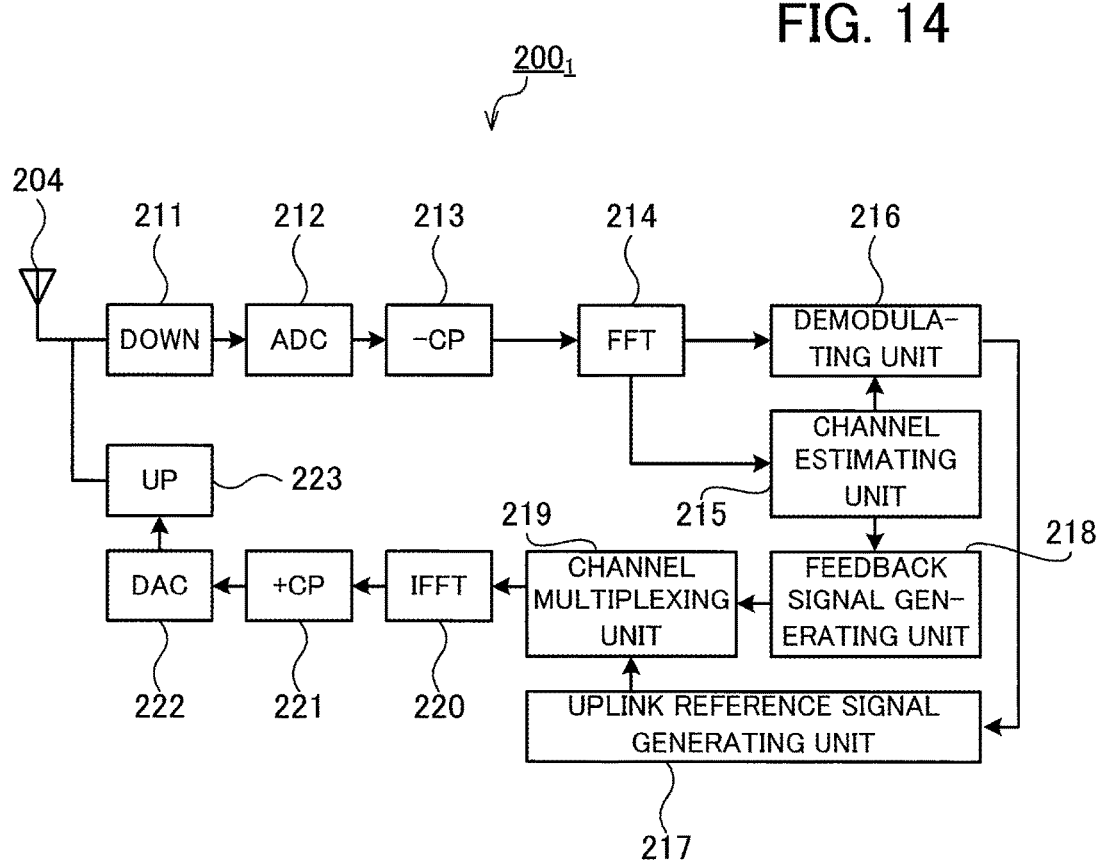
FIG. 14 is a block diagram illustrating an example of functions of each terminal according to the second embodiment.

Let us refer to FIG. 14 which is a block diagram illustrating an example of functions of the terminals according to the second embodiment. Note that functions of the terminal $200_1$ are described next as an example for the purpose of illustration; however, functions of the remaining terminals $200_2, \ldots, 200_U$ are the same as those of the terminal $200_1$. As illustrated in FIG. 14, the terminal $200_1$ includes the antenna 204, a down-converter 211, an ADC 212, a cyclic prefix remover 213, an FFT unit 214, a channel estimating unit 215, and a demodulating unit 216. The terminal $200_1$ also includes an uplink reference signal generating unit 217, a feedback signal generating unit 218, a channel multiplexing unit 219, an IFFT unit 220, a cyclic prefix adder 221, a DAC 222, and an up-converter 223.

Note that the functions of the down-converter 211, the ADC 212, the DAC 222, and the up-converter 223 may be implemented, for example, by the wireless circuit 203. The functions of the cyclic prefix remover 213, the FFT unit 214, the channel estimating unit 215, the demodulating unit 216, the uplink reference signal generating unit 217, the feedback signal generating unit 218, the channel multiplexing unit 219, the IFFT unit 220, and the cyclic prefix adder 221 may be implemented by the processor 202, or an LSI or the like provided separately.

Next described is a processing flow carried out in the beam search and CSI estimation.

(Phase #1)

The terminal $200_1$ receives, from the antenna 204, a plurality of downlink reference signals (radio frequency signals) to which the individual analog beamforming vectors $v_1, \ldots, v_M$ have been applied. The down-converter 211 converts the downlink reference signals input thereto via the antenna 204 into analog signals in the baseband. An output of the down-converter 211 is input to the ADC 212. The ADC 212 converts the analog signals input thereto into digital signals (OFDM symbols).

An output of the ADC 212 is input to the cyclic prefix remover 213. The cyclic prefix remover 213 removes cyclic prefixes from the OFDM symbols output from the ADC 212 to thereby extract useful symbols. An output of the ADC 212 is input to the FFT unit 214. The FFT unit 214 performs FFT on the useful symbols output from the ADC 212 to output signals in the frequency domain.

The output of the FFT unit 214 is then input to the channel estimating unit 215. The channel estimating unit 215 performs channel estimation based on the signals output from the FFT unit 214. An output (implicit CSI) of the channel estimating unit 215 is input to the feedback signal generating unit 218. The feedback signal generating unit 218 generates a feedback signal including a statement on the implicit CSI.

Note that the implicit CSI statement above is, for example, information on reference signal received power (RSRP) obtained by quantizing a received power value of each downlink reference signal, or a channel quality indicator (CQI) corresponding to each signal-to-interference plus noise power ratio (SINR). Instead of directly using RSRPs and CQIs, the implicit CSI statement may refer to the beam number of a beam with the maximum RSRP or the beam numbers of a predetermined number of beams with large RSRPs. In addition, implicit CSI associated with some beams in descending order of RSRPs may be included in the feedback signal.

The feedback signal generated by the feedback signal generating unit 218 is mapped by the channel multiplexing unit 219 to subcarriers, and converted by the IFFT unit 220 into the time domain. Subsequently, cyclic prefixes are added by the cyclic prefix adder 221 to the feedback signal, which is then converted by the DAC 222 into an analog signal. The analog signal in the baseband is converted by the up-converter 223 into a radio frequency signal and then transmitted to the base station 100 via the antenna 204.

Note that the feedback signal may be transmitted after all the downlink reference signals corresponding to the analog beamforming vectors $v_1, \ldots, v_M$ are received, or each time a downlink reference signal is received. Alternatively, the feedback signal may be transmitted to the base station 100 each time a predetermined number of downlink reference signals are received. The same feedback signal may be designed to be transmitted multiple times. In addition, in the case of presenting received power values as implicit CSI to be fed back, measurement of the received power values may be made before the down-converter 211 (in a wireless band).

(Phase #2)

In the case where the base station 100 has allocated wireless resources to the terminal $200_1$ and transmitted a downlink control signal requesting transmission of uplink reference signals, the terminal $200_1$ receives the downlink control signal via the antenna 204. The downlink control signal (a radio frequency signal) is converted into a digital signal in the baseband and then input to the demodulating unit 216. The demodulating unit 216 demodulates the downlink control signal and extracts information indicating allocation of wireless resources to the terminal $200_1$ (allocation information).

The allocation information extracted by the demodulating unit 216 is input to the uplink reference signal generating unit 217. The uplink reference signal generating unit 217 generates uplink reference signals based on the allocation information input thereto. The uplink reference signals generated by the uplink reference signal generating unit 217 are mapped by the channel multiplexing unit 219 to subcarriers, and transmitted from the antenna 204 via the IFFT unit 220, the cyclic prefix adder 221, the DAC 222, and the up-converter 223.

The base station 100 and the terminals $200_1, \ldots, 200_U$ have the functions described above.

(Process Sequence)

Figure 15:
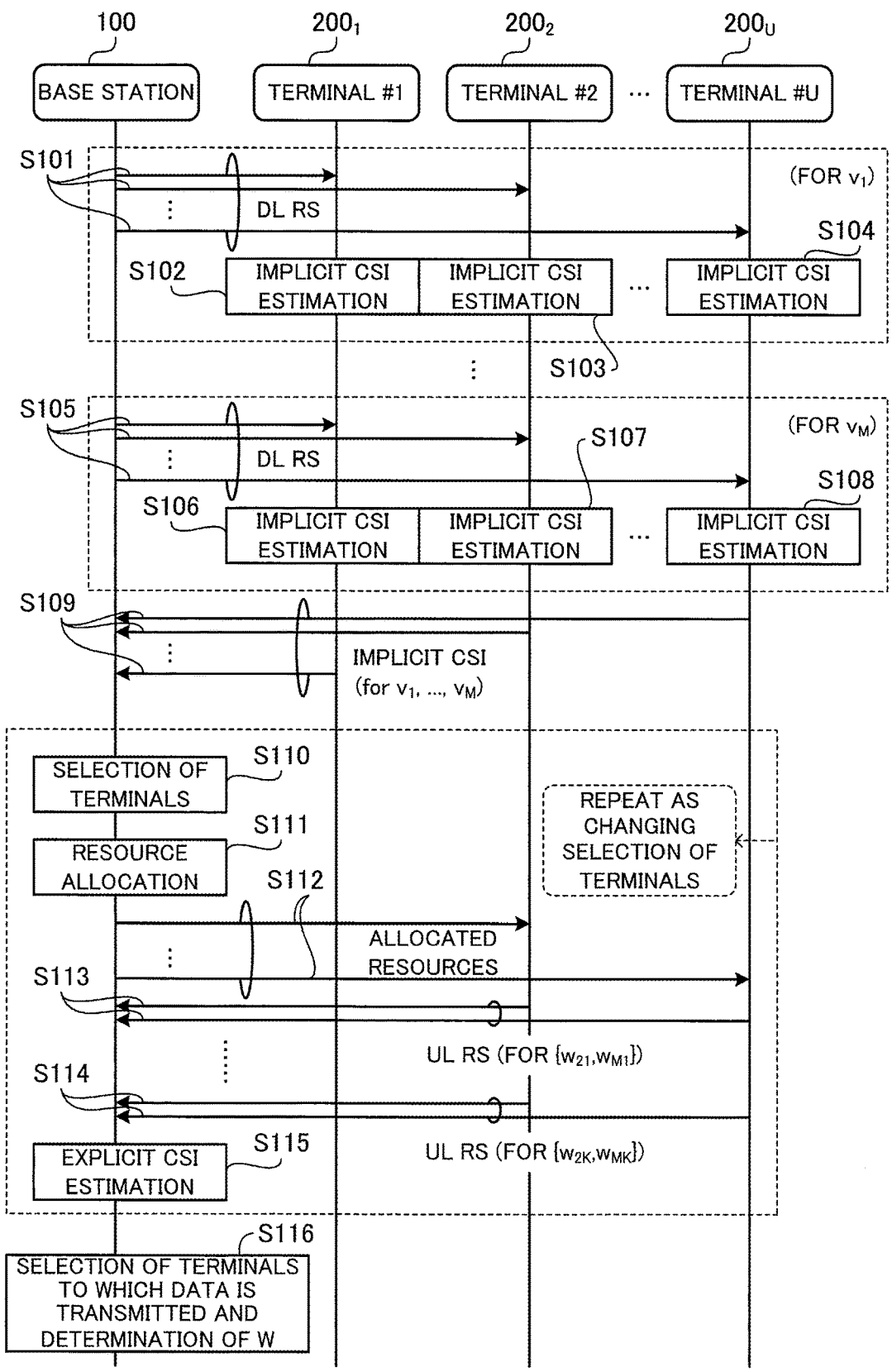
FIG. 15 is a sequence diagram illustrating a processing flow of CSI estimation executed by the wireless communication system according to the second embodiment.
Figure 16:
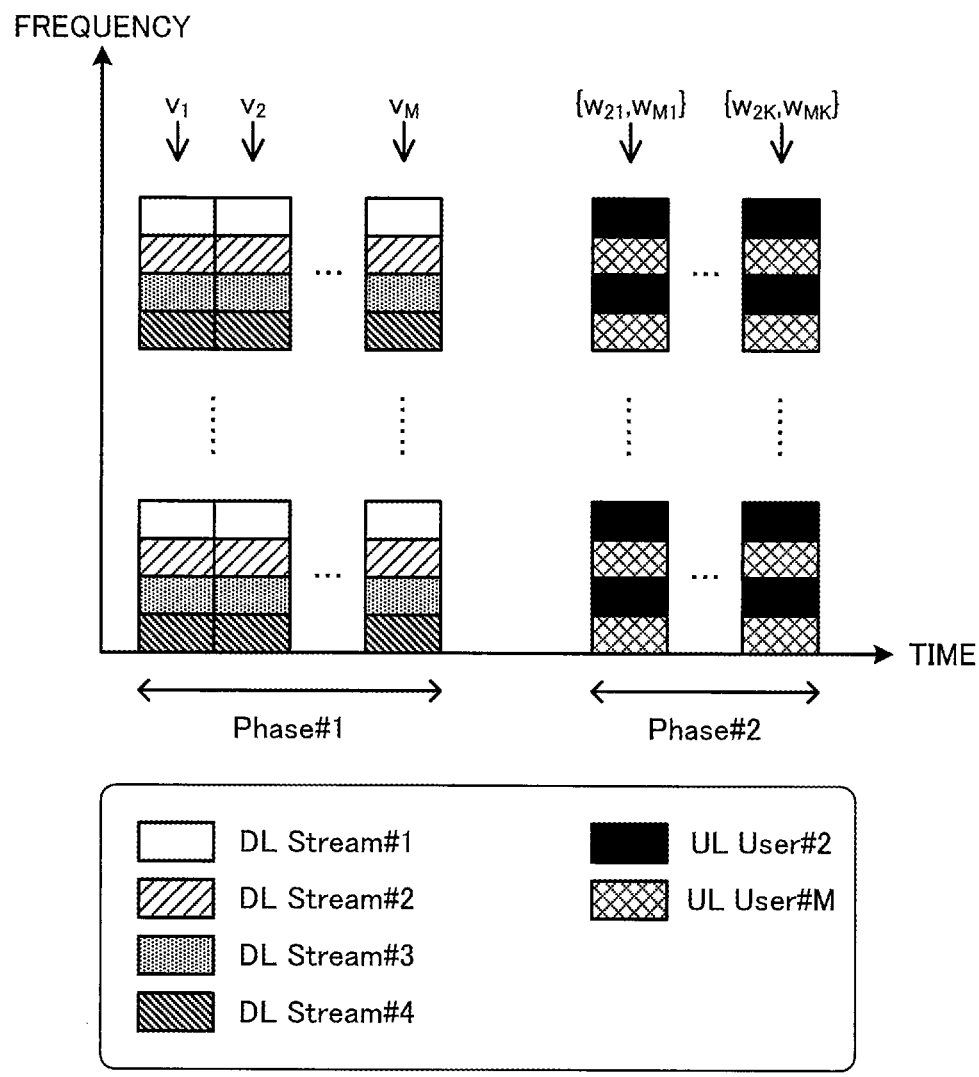
FIG. 16 illustrates resource allocation according to the second embodiment.

Next described is a processing flow of the beam search and the CSI estimation, with reference to FIG. 15. The following also refers to resource allocation with reference to FIG. 16. FIG. 15 is a sequence diagram illustrating a processing flow of CSI estimation executed by the wireless communication system according to the second embodiment. FIG. 16 illustrates resource allocation according to the second embodiment. Note that the example of FIG. 12 is used here for the purpose of illustration.

(Steps S101 to S104) The base station 100 transmits, to the terminals $200_1, \ldots, 200_U$, downlink reference signals for which analog beamforming has been implemented using the analog beamforming vector $v_1$. The terminal $200_1$ receives a downlink reference signal transmitted from the base station 100, and performs implicit CSI estimation based on the received downlink reference signal. In like fashion, each of the terminals $200_2, \ldots, 200_U$ receives a downlink reference signal transmitted from the base station 100, and performs implicit CSI estimation based on the received downlink reference signal.

(Steps S105 to S108) The base station 100 transmits, to the terminals $200_1, \ldots, 200_U$, downlink reference signals for which analog beamforming has been implemented using the individual analog beamforming vectors $v_2, \ldots, v_M$. As for each of the analog beamforming vectors $v_2, \ldots, v_M$, the terminals $200_1, \ldots, 200_U$ individually receive downlink reference signals transmitted from the base station 100 and perform implicit CSI estimation based on the received downlink reference signals.

(Step S109) Each of the terminals $200_1, \ldots, 200_U$ feeds, back to the base station 100, implicit CSI estimated for the individual analog beamforming vectors $v_1, \ldots, v_M$ based on the received downlink reference signals.

(Step S110) With the above-described function of the reference signal allocating unit 188, the base station 100 selects a predetermined number of terminals (two terminals in this example) based on the implicit CSI fed back from the terminals $200_1, \ldots, 200_U$.

For example, the base station 100 identifies, for each of the terminals $200_1, \ldots, 200_U$, an analog beamforming vector with the maximum received power amongst the analog beamforming vectors $v_1, \ldots, v_M$. Then, the base station 100 selects, amongst the terminals $200_1, \ldots, 200_U$, the predetermined number of terminals in descending order of the maximum received power (the terminals $200_2$ and $200_U$ in this example). The base station 100 also identifies the analog beamforming vectors $v_2$ and $v_M$ corresponding to the maximum received power of the selected terminals $200_2$ and $200_U$.

(Steps S111 and S112) With the above-described function of the reference signal allocating unit 188, the base station 100 allocates wireless resources to be used by the selected terminals $200_2$ and $200_U$ to transmit uplink reference signals. Then, the base station 100 transmits, to the terminals $200_2$ and $200_U$, downlink control signals including information on the allocated wireless resources and requesting transmission of the uplink reference signals.

In this example, with respect to each terminal, K analog beamforming vectors are set for explicit CSI estimation. The analog beamforming vectors $w_{21}, \ldots, w_{2K}$ are set for the terminal $200_2$, and the analog beamforming vectors $w_{M1}, \ldots, w_{MK}$ are set for the terminal $200_U$. The analog beamforming vectors $w_{21}, \ldots, w_{2K}$ are set based on the analog beamforming vector $v_2$ in such a manner as to take finer discretization of beam directions than that of the analog beamforming vectors $v_1, \ldots, v_M$ (see FIG. 12). In like fashion, the analog beamforming vectors $w_M, \ldots, w_{MK}$ are set based on the analog beamforming vector $v_M$. In this case, wireless resources are allocated to the terminals $200_2$ and $200_U$ in such a manner that an uplink reference signal is transmitted from the individual terminals $200_2$ and $200_U$ K times.

(Steps S113 and S114) The terminal $200_2$ extracts the wireless resource information from the downlink control signal received from the base station 100, and transmits uplink reference signals to the base station 100 using the wireless resources allocated to the terminal $200_2$. In like fashion, the terminal $200_U$ extracts the wireless resource information from the downlink control signal received from the base station 100, and transmits uplink reference signals to the base station 100 using the wireless resources allocated to the terminal $200_U$.

As mentioned above, the wireless resources have been allocated to the terminals $200_2$ and $200_U$ to allow the terminals $200_2$ and $200_U$ to transmit an uplink reference signal K times. Therefore, each of the terminals $200_2$ and $200_U$ transmits an uplink reference signal K times. In this regard, in receiving the $q^{th}$ uplink reference signals (q=1, \ldots, K), the base station 100 implements reception beamforming for the uplink reference signals using an analog beamforming matrix $W_q$ with a combination of the analog beamforming vectors $\{w_{2q}, w_{Mq}\}$ as its elements.

(Step S115) With the above-described function of the channel estimating unit 189, the base station 100 performs explicit CSI estimation based on uplink reference signals received with the application of analog beamforming matrices $W_1, \ldots, W_K$. Note that the process of steps S110 to S115 may be repeated as changing the combination of terminals selected in step S110.

(Step S116) The base station 100 selects a group of terminals to which user data is to be transmitted, and also determines, based on the estimated explicit CSI, the analog beamforming matrix W that improves the throughput for the group of terminals selected. Subsequently, the user data is transmitted using the determined analog beamforming matrix W. After the completion of step S116, the processing series illustrated in FIG. 15 ends.

Time-frequency mapping of the above-described downlink reference signals and uplink reference signals is depicted in FIG. 16, which illustrates the case where the number of downlink streams L is 4, for example. During Phase #1 described above, for example, time is allocated to each of the analog beamforming vectors $v_1, \ldots, v_M$, and transmission frequencies for downlink reference signals, which are transmitted with the application of the analog beamforming vectors $v_1, \ldots, v_M$, are allocated to the individual streams.

Assume here that the terminals $200_2$ and $200_U$ (Users #2 and #M) are selected. During Phase #2, for example, time is allocated to each of the analog beamforming matrices $\{w_{21}, w_{M1}\}, \ldots, \{w_{2K}, w_{MK}\}$ above. In addition, transmission frequencies for uplink reference signals, which are received with the application of the analog beamforming matrices $\{w_{21}, w_{M1}\}, \ldots, \{w_{2K}, w_{MK}\}$, are allocated to the individual terminals. Examples of units of time and frequency include OFDM symbols and subcarriers. In the example of FIG. 16, the reference signals are mapped continuously in the time and frequency directions; however, they may be mapped in a discontinuous manner.

(Operations of Base Station)

Figure 17:
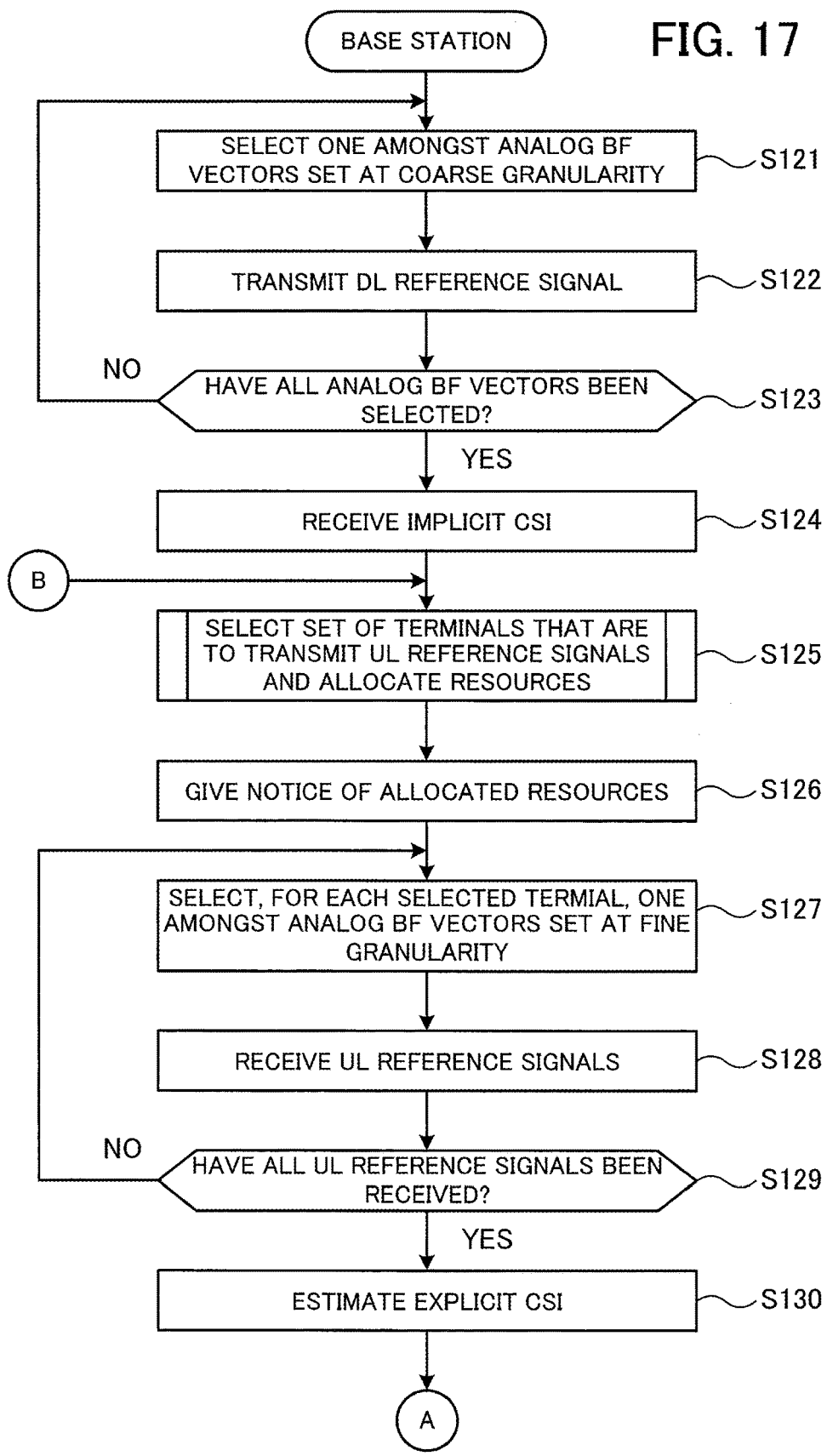
FIG. 17 is a first flow diagram illustrating a processing flow executed by the base station according to the second embodiment.
Figure 18:
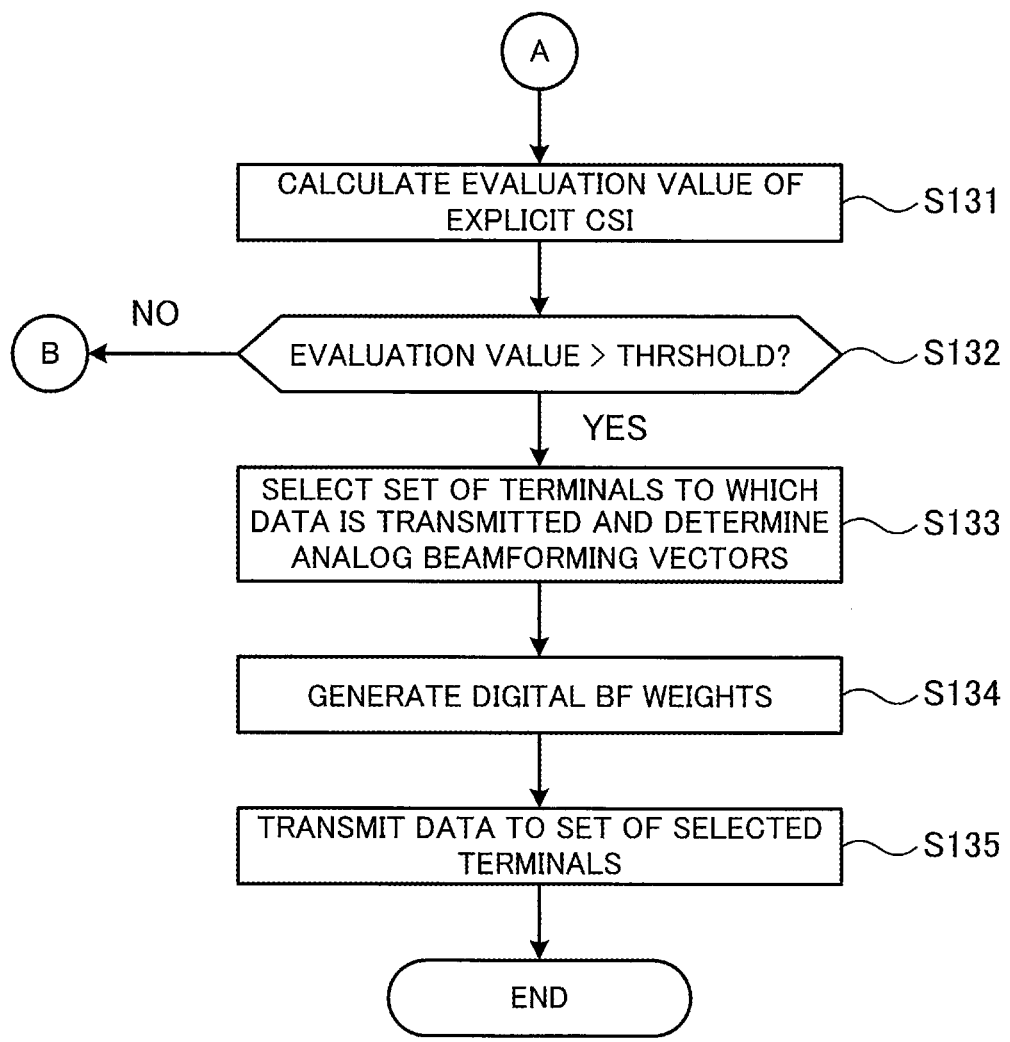
FIG. 18 is a second flow diagram illustrating the processing flow executed by the base station according to the second embodiment.

Further explanation is given next on operations of the base station 100 with reference to FIGS. 17 and 18. FIG. 17 is a first flow diagram illustrating a processing flow executed by the base station according to the second embodiment. FIG. 18 is a second flow diagram illustrating the processing flow executed by the base station according to the second embodiment.

(Step S121) The base station 100 selects an analog beamforming vector amongst analog beamforming vectors set at coarse granularity.

For example, the memory 101 of the base station 100 stores therein information on beam directions (see FIG. 7) each defined by the azimuth angle $\varphi$ and the zenith angle $\theta$. Each of the beam directions is controlled, for example, based on a pair of the azimuth and zenith angles $\varphi$ and $\theta$ individually selected from a predetermined set of the azimuth angles $\varphi$ $\{0, 10, \ldots, 180\}$ (in degrees) and a predetermined set of the zenith angles $\theta$ $\{0, 10, \ldots, 180\}$ (in degrees). The analog beamforming vectors correspond one-to-one with the beam directions. The analog beamforming vectors being set at coarse granularity means the corresponding beam directions being sparsely distributed. That is, the granularity of the analog beamforming vectors is termed "being coarse" when the intervals of the azimuth and zenith angles $\varphi$ and $\theta$ defining the beam directions are large.

The analog beamforming vectors $v_1, \ldots, v_M$ used by the base station 100 to transmit downlink reference signals in Phase #1 are set at coarser granularity compared to analog beamforming vectors used by the base station 100 to receive uplink reference signals in Phase #2. Then, information on the analog beamforming vectors $v_1, \ldots, v_M$ with coarse granularity is stored in the memory 101 as information on the beam directions. In step S121, the processor 102 of the base station 100 refers to this information stored in the memory 101 and selects an unselected analog beamforming vector.

(Step S122) The base station 100 transmits a downlink reference signal with the application of the analog beamforming vector selected in step S121. For example, the processor 102 of the base station 100 controls the wireless circuit 104 (the analog beamforming unit 141a or 141b) to execute a process of multiplying the downlink reference signal (a radio frequency signal) by an analog beamforming weight (e.g. phase shift control). The radio frequency signal after the multiplication of the analog beamforming weight is then transmitted to the terminals $200_1, \ldots, 200_U$ via the antenna elements $Ant_1, \ldots, Ant_n$.

(Step S123) The processor 102 of the base station 100 refers to the above-mentioned information stored in the memory 101 to determine whether to have selected all the analog beamforming vectors. If all the analog beamforming vectors have been selected, the process moves to step S124. On the other hand, if there is one or more unselected analog beamforming vectors, the process moves to step S121.

(Step S124) The base station 100 receives feedback signals transmitted from the terminals $200_1, \ldots, 200_U$ and acquires implicit CSI statements from the feedback signals. Note that the implicit CSI statement included in each feedback signal may be implicit CSI itself, such as a received power value, or information on a beam number corresponding to the maximum received power value, as has been described above.

(Steps S125 and S126) Based on the implicit CSI statements, the processor 102 of the base station 100 selects, amongst the terminals $200_1, \ldots, 200_U$, a set of terminals which are to transmit uplink reference signals. The processor 102 also allocates wireless resources to each terminal of the selected set of terminals. Then, the base station 100 transmits, to each of the selected terminals, a downlink control signal including information about the allocated resources and requesting transmission of uplink reference signals.

(Step S127) The base station 100 selects, for each of the selected terminals, an analog beamforming vector amongst analog beamforming vectors set at fine granularity.

For example, the memory 101 of the base station 100 stores therein information on the analog beamforming vectors set at fine granularity, together with the information on the analog beamforming vectors $v_1, \ldots, v_M$ set at coarse granularity. In the case where the azimuth and zenith angles $\varphi$ and $\theta$ of the beam directions corresponding to the analog beamforming vectors $v_1, \ldots, v_M$ with coarse granularity are defined at 10-degree intervals, beam directions corresponding to the analog beamforming vectors at fine granularity are defined, for example, at intervals of less than 10 degrees (for example, at 5-degree intervals). Note that the information stored in the memory 101 may indicate only the angle intervals.

With respect for each of the terminals selected in step S125, the processor 102 identifies an analog beamforming vector for which the best implicit CSI has been obtained. Based on the beam direction corresponding to the analog beamforming vector identified for each of the terminals, the processor 102 determines a predetermined number (for example, K) of beam directions at angle intervals with fine granularity. Then, the processor 102 stores, in the memory 101, information on the predetermined number of beam directions (i.e., information on analog beamforming vectors with fine granularity) determined for each of the selected terminals.

Note that the process of determining the analog beamforming vectors at fine granularity for each terminal needs to be performed only once during the processing loop of steps S127 to S129. In step S127, the processor 102 of the base station 100 refers to the information on the analog beamforming vectors with fine granularity, stored in the memory 101, and selects one unselected analog beamforming vector for each terminal. That is, the processor 102 selects as many analog beamforming vectors as the number of terminals selected in step S125 and generates an analog beamforming matrix with a combination of the selected analog beamforming vectors as its elements.

(Step S128) The base station 100 receives uplink reference signals transmitted from the selected terminals (for example, the terminals $200_2$ and $200_U$). In this regard, the processor 102 of the base station 100 receives the uplink reference signals with the application of the combination of the analog beamforming vectors selected in step S127 (i.e., the analog beamforming matrix).

(Step S129) The base station 100 determines whether to have received all the uplink reference signals. As many uplink reference signals as the number of beam directions (for example, K) pointed to each of the selected terminals are sequentially transmitted from the terminal to the base station 100. When the reception of all the uplink reference signals is completed, the process moves to step S130. On the other hand, if there is one or more uplink reference signals yet to be received, the process moves to step S127.

(Step S130) The processor 102 of the base station 100 performs channel estimation based on the uplink reference signals received with the application of the analog beamforming vectors with fine granularity to thereby acquire explicit CSI. After the completion of step S130, the process moves to step S131.

(Steps S131 and S132) The processor 102 of the base station 100 calculates an evaluation value of the explicit CSI. For example, the processor 102 calculates a determinant (channel capacity) of the explicit CSI as the evaluation value. Then, the processor 102 compares the calculated evaluation value against a predetermined threshold (a value preliminarily stored in the memory 101) If the evaluation value is greater than the threshold, the process moves to step S133. On the other hand, if the evaluation value does not exceed the threshold, the process moves to step S125.

(Steps S133 and S134) The processor 102 of the base station 100 selects a set of terminals to which data is to be transmitted. The processor 102 also determines analog beamforming vectors that improve the throughput when the data is transmitted to the set of terminals selected. In addition, the processor 102 generates digital beamforming weights based on the explicit CSI so as to reduce interference among data streams transmitted to the set of terminals selected.

(Step S135) The base station 100 transmits data to the set of selected terminals with the application of the digital and analog beamforming. After the completion of step S135, the processing series illustrated in FIG. 18 ends.

(Resource Allocation)

Figure 19:
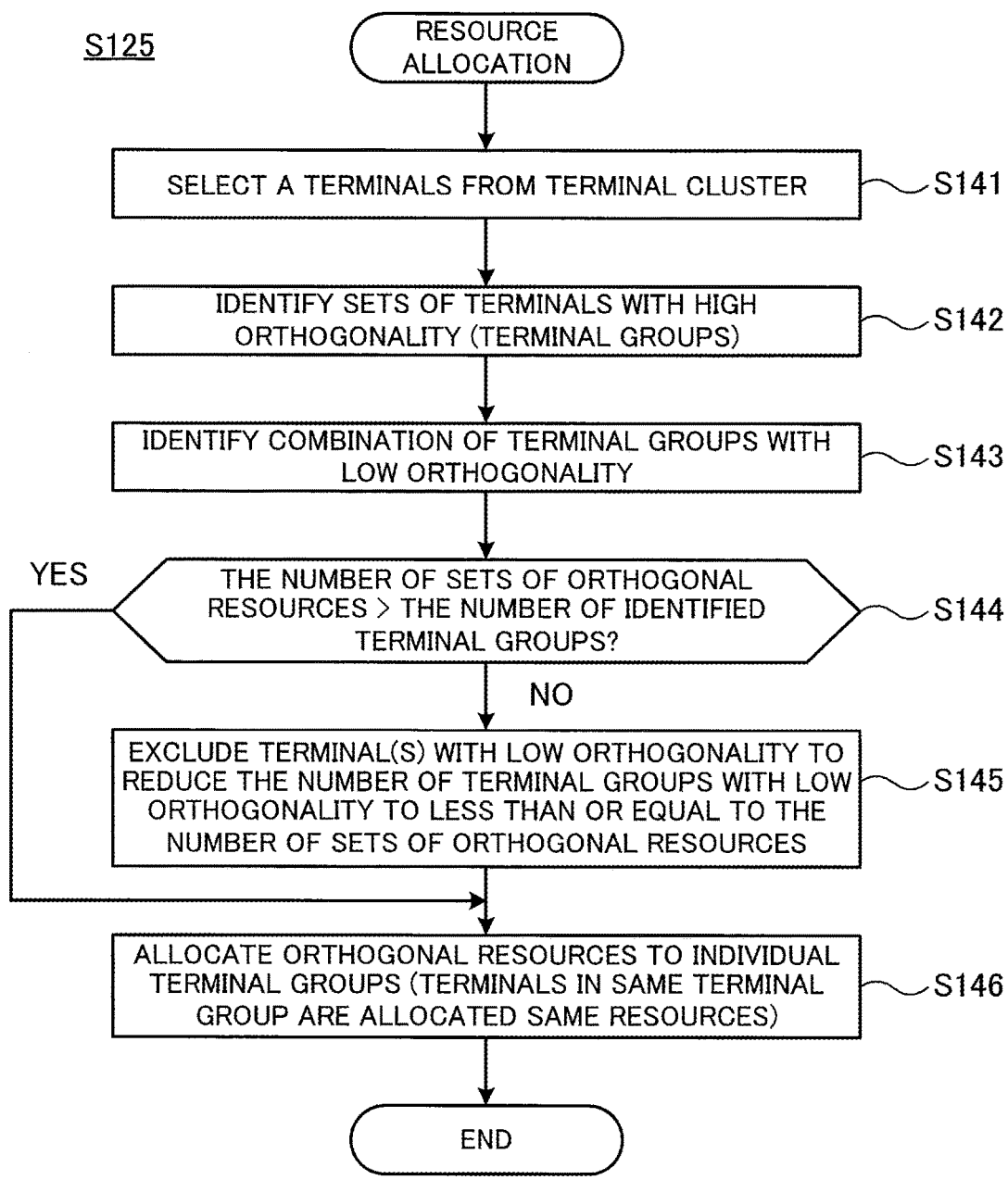
FIG. 19 is a flow diagram of a resource allocation process executed by the base station according to the second embodiment.
Figure 20:
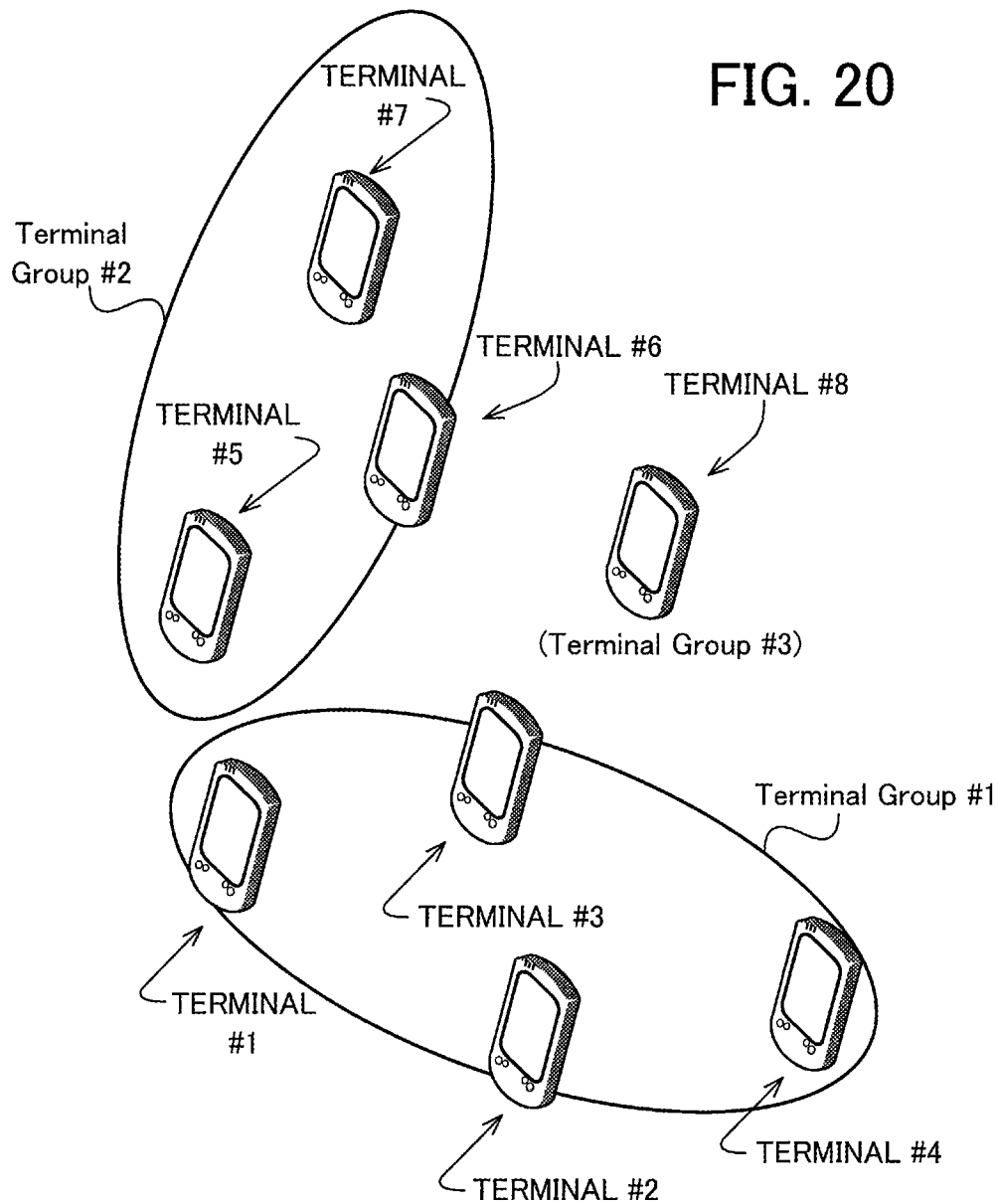
FIG. 20 illustrates the resource allocation process executed by the base station according to the second embodiment.

Further explanation is given next on the flow of the resource allocation process (corresponding to step S125 above) with reference to FIGS. 19 and 20.

FIG. 19 is a flow diagram of a resource allocation process executed by the base station according to the second embodiment. FIG. 20 illustrates the resource allocation process executed by the base station according to the second embodiment. Note that the resource allocation process of FIGS. 19 and 20 is merely an example, and a different resource allocation process may be employed in applying the technique according to the second embodiment.

(Step S141) The base station 100 selects, amongst a terminal cluster (composed of the terminals $200_1$, ..., $200_U$), A terminals (A is an integer greater than or equal to 1). In this regard, the base station 100 refers to implicit CSI fed back from the individual terminals $200_1$, ..., $200_U$ to select the A terminals. In the example of FIG. 20, Terminals #1 to #8 (the terminals $200_1$, ..., $200_8$) are selected.

(Step S142) The base station 100 identifies one or more sets of terminals exhibiting high orthogonality amongst the selected terminals. The orthogonality between terminals is evaluated, for example, based on a signal-to-interference power ratio (SIR) given by the following Equation (6). A pair of terminals whose SIR is less than a predetermined threshold is determined to have high orthogonality.

Note that $SIR_{pq}(v_r)$ in Equation (6) below denotes the SIR between terminals #p and #q obtained when the terminals #p and #q receive the downlink reference signal with the application of the analog beamforming vector $v_r$. $RSRP_p(v_r)$ denotes the RSRP obtained when the terminal #p receives the downlink reference signal with the application of the analog beamforming vector $v_r$. In the example of FIG. 20, Terminals #1 to #4 (the terminals $200_1$, ..., $200_4$) are identified as a set of terminals with high orthogonality (Terminal Group #1). In addition, Terminals #5 to #7 (the terminals $200_5$, ..., $200_7$) are identified as a set of terminals with high orthogonality (Terminal Group #2).

$$SIR_{pq}(v_r) = \frac{RSRP_p(v_r)}{RSRP_q(v_r)} \quad (6)$$

(Step S143) The base station 100 identifies a combination of terminal groups with low orthogonality. In example of FIG. 20, Terminal Groups #1 and #2 have low orthogonality, and Terminal Groups #1 and #2 and Terminal #8 (the terminal $200_8$) also have low orthogonality. For the purpose of illustration, Terminal #8 (the terminal $200_8$) is referred to as Terminal Group #3. That is, in this example, a combination of Terminal Groups #1, #2, and #3 is identified.

(Step S144) The base station 100 compares the number of sets of orthogonal resources (for example, 2) and the number of terminal groups identified in step S143 (3 in the example of FIG. 20), and determines whether the number of orthogonal resources is greater than the number of identified terminal groups. The number of sets of orthogonal resources indicates the number of sets of wireless resources with high orthogonality amongst sets of wireless resources available for transmission of uplink reference signals. If the number of sets of orthogonal resources is greater than the number of terminal groups, the process moves to step S146. On the other hand, the number of sets of orthogonal resources is not greater than the number of terminal groups, the process moves to step S145.

(Step S145) The base station 100 excludes terminals with low orthogonality from wireless resource allocation to reduce the number of terminal groups with low orthogonality to less than or equal to the number of sets of orthogonal resources. For example, in the case where the number of sets of orthogonal resources is 2 as in the example of FIG. 20, at least one amongst Terminal Groups #1, #2, and #3 is excluded from wireless resource allocation. For example, the base station 100 selects, amongst Terminal Groups #1, #2, and #3, a terminal group to be excluded in ascending order of the number of terminals included therein. In the example of FIG. 20, Terminal Group #3 is excluded.

(Step S146) The base station 100 allocates wireless resources to each of the terminal groups eligible for wireless resource allocation in such a manner that the allocated wireless resources are orthogonal among the terminal groups. In the example of FIG. 20, wireless resource allocation is made in such a manner that wireless resources allocated to Terminal Group #1 are orthogonal to those allocated to Terminal Group #2.

On the other hand, the same wireless resources are allocated to individual terminals belonging to the same terminal group. For example, Terminals #1 to #4 (the terminals $200_1, \ldots, 200_4$) included in Terminal Group #1 are allocated the same wireless resources. In like fashion, Terminals #5 to #7 (the terminals $200_5, \ldots, 200_7$) included in Terminal Group #2 are allocated the same wireless resources. After the completion of step S146, the processing series illustrated in FIG. 19 ends.

Use efficiency of wireless resources for transmission of uplink reference signals in Phase #2 is improved by grouping together terminals with high orthogonality and allocating the same wireless resources to individual terminals belonging to the same group, as described above.

(Operations of Terminals)

Figure 21:
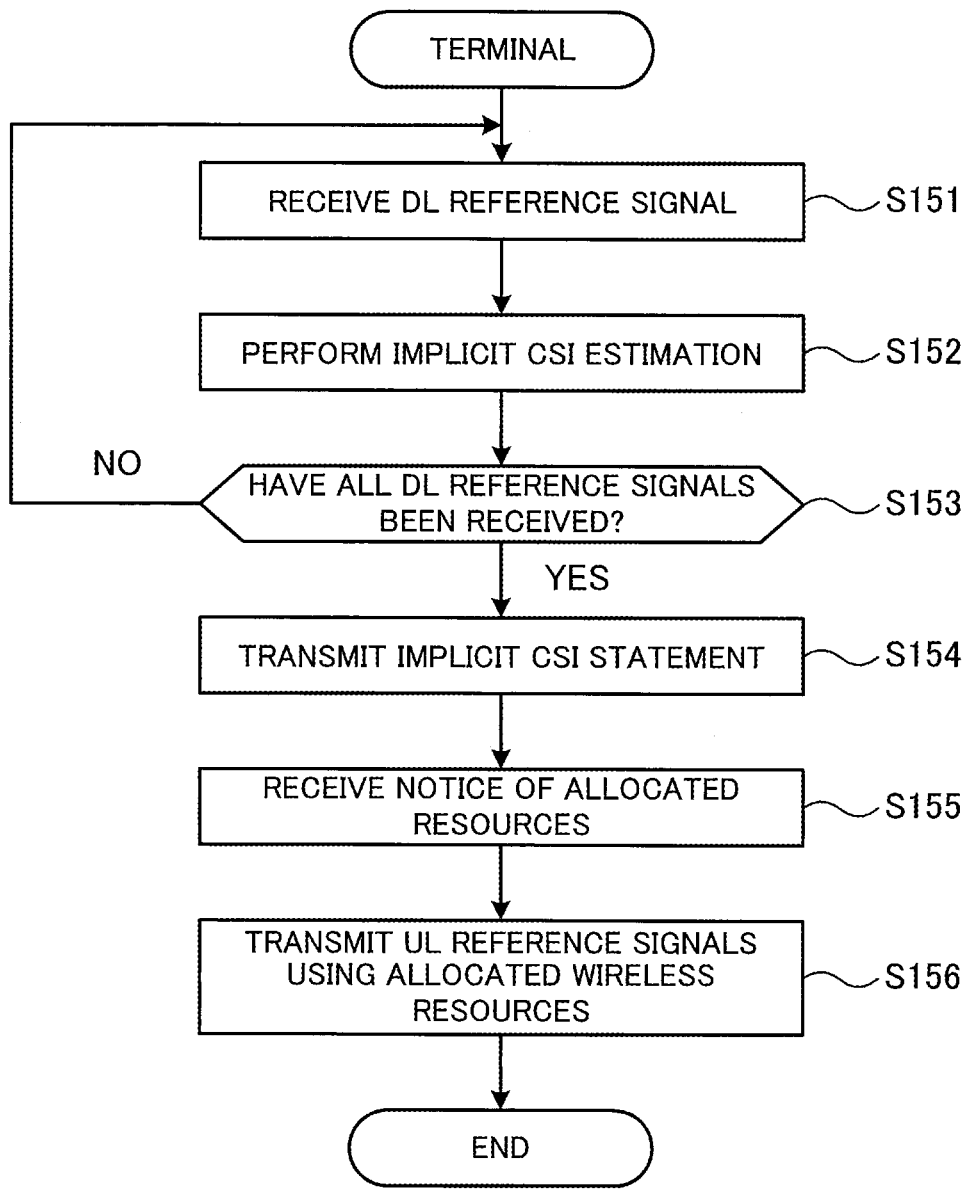
FIG. 21 is a flow diagram illustrating a processing flow executed by each terminal according to the second embodiment.

Next described are operations of the terminals $200_1, \ldots, 200_U$ with reference to FIG. 21. FIG. 21 is a flow diagram illustrating a processing flow executed by each terminal according to the second embodiment. Note that the following is described taking operations of the terminal $200_1$ as an example for the purpose of illustration; however, the terminals $200_2, \ldots, 200_U$ individually carry out the same operations as the terminal $200_1$.

(Step S151) The terminal $200_1$ receives a downlink reference signal transmitted from the base station 100 in Phase #1. In Phase #1, as many downlink reference signals as the number of predetermined analog beamforming vectors with coarse granularity are transmitted, as has been described above. Therefore, the terminal $200_1$ sequentially receives a plurality of downlink reference signals transmitted from the base station 100.

(Step S152) The terminal $200_1$ performs implicit CSI estimation of the received downlink reference signal. Note that an estimate value of the implicit CSI is, for example, a received power value or RSRP of the downlink reference signal.

(Step S153) The terminal $200_1$ determines whether to have received all the downlink reference signals. If the terminal $200_1$ have received all the downlink reference signals, the process moves to step S154. On the other hand, if there is one or more unreceived downlink reference signals, the process moves to step S151.

Note that the terminal $200_1$ may determine the completion of the reception by determining whether to have received as many downlink reference signals as the number of predetermined analog beamforming vectors with coarse granularity. Alternatively, the completion of the reception may be determined when a predetermined period of time has elapsed, or based on beam numbers used to identify beams scheduled to be sent in Phase #1.

(Step S154) The terminal $200_1$ transmits, to the base station 100, a feedback signal including an implicit CSI statement. The implicit CSI statement includes, for example, received power values of the downlink reference signals, RSRPs obtained by quantizing the received power values, or CQIs individually corresponding to SINRs. Note that the terminal $200_1$ may include the following in the feedback signal to be transmitted as the implicit CSI statement: the beam number of a beam with the maximum RSRP; the beam numbers of a predetermined number of beams with large RSRP; or implicit CSI associated with some beams with large RSRP.

(Steps S155 and S156) The terminal $200_1$ receives, from the base station 100, a downlink control signal including notice of allocated resources. If being allocated wireless resources for uplink reference signal transmission, the terminal $200_1$ transmits uplink reference signals using the allocated wireless resources.

After the completion of step S156, the processing series illustrated in FIG. 21 ends. Note that, in the example of FIG. 21, the feedback signal is transmitted to the base station 100 after the terminal $200_1$ performs implicit CSI estimation for all the downlink reference signals; however, a feedback signal may be transmitted each time the terminal $200_1$ performs implicit CSI estimation for a downlink reference signal.

The functions and processing flows of the base station 100 and the terminals $200_1, \ldots, 200_U$ have been described thus far.

[b-3. Modifications]

Next described are modifications of the second embodiment.

(Modification #1: Timing for Terminal Selection)

The above description is based on an example of the method for selecting terminals which are to transmit uplink reference signals for explicit CSI estimation and selecting terminals to which data is transmitted after the explicit CSI estimation. A modification described next (Modification #1) is concerned with a method for selecting, based on implicit CSI, terminals to which data is transmitted and causing the selected terminals to transmit uplink reference signals for explicit CSI estimation, as illustrated in FIG. 22.

Figure 22:
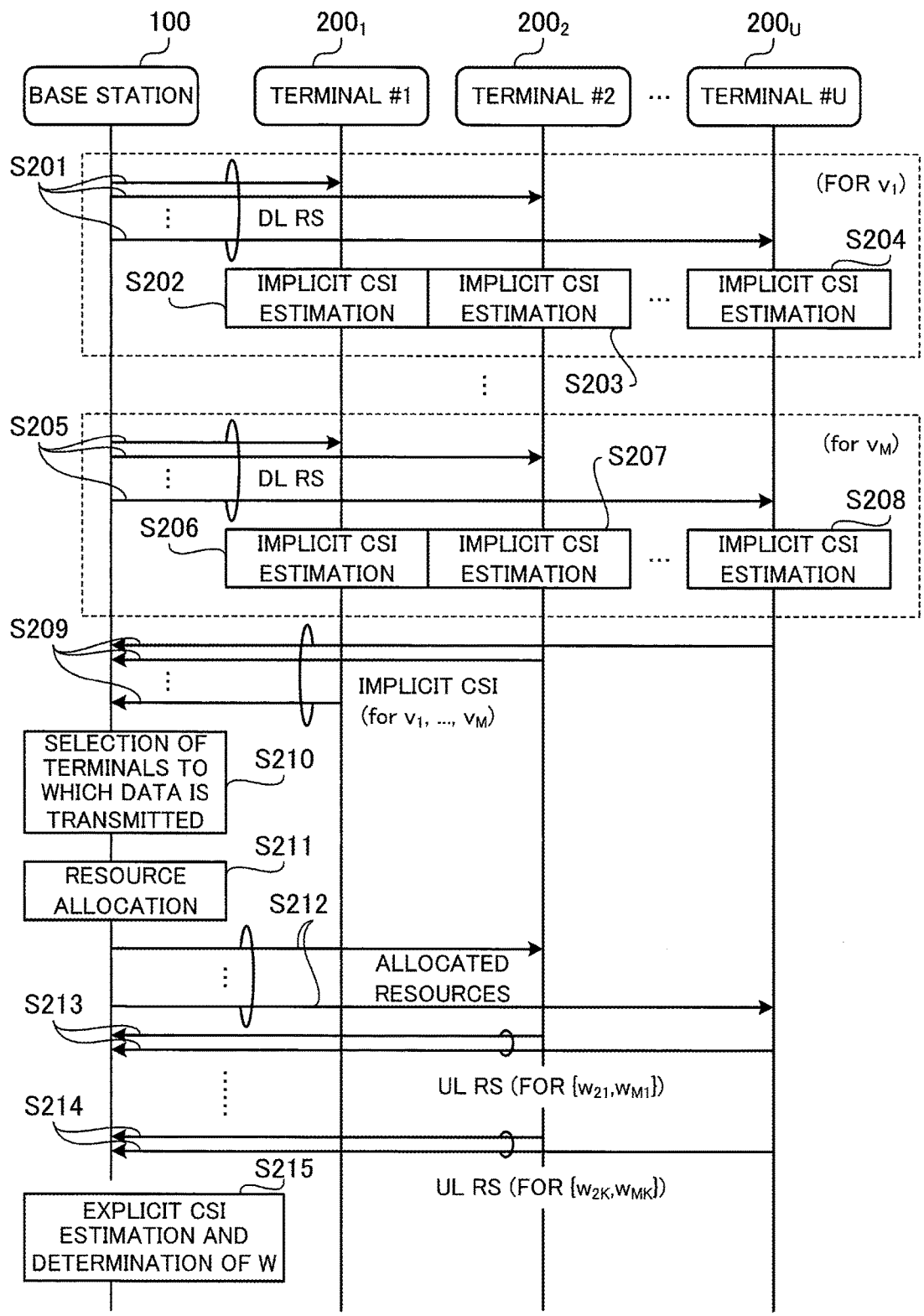
FIG. 22 is a sequence diagram illustrating a processing flow of CSI estimation executed by a wireless communication system according to a modification of the second embodiment.

FIG. 22 is a sequence diagram illustrating a processing flow of CSI estimation executed by a wireless communication system according to a modification of the second embodiment. Note that in the case of introducing the method of Modification #1, an arrow (a flow of information) extending from the scheduling unit 190 to the uplink reference signal allocating unit 188 is added to FIG. 13 which illustrates the function blocks of the base station 100. On the other hand, there is no change in the functions and operations of the terminals $200_1, \ldots, 200_U$.

(Steps S201 to S204) The base station 100 transmits, to the terminals $200_1, \ldots, 200_U$, downlink reference signals for which analog beamforming has been implemented using the analog beamforming vector $v_1$. The terminal $200_1$ receives a downlink reference signal transmitted from the base station 100, and performs implicit CSI estimation based on the received downlink reference signal. In like fashion, each of the terminals $200_2, \ldots, 200_U$ receives a downlink reference signal transmitted from the base station 100, and performs implicit CSI estimation based on the received downlink reference signal.

(Steps S205 to S208) The base station 100 transmits, to the terminals $200_1, \ldots, 200_U$, downlink reference signals for which analog beamforming has been implemented using the individual analog beamforming vectors $v_2, \ldots, v_M$. As for each of the analog beamforming vectors $v_2, \ldots, v_M$, the terminals $200_1, \ldots, 200_U$ individually receive downlink reference signals transmitted from the base station 100 and perform implicit CSI estimation based on the received downlink reference signals.

(Step S209) Each of the terminals $200_1, \ldots, 200_U$ feeds, back to the base station 100, implicit CSI estimated for the individual analog beamforming vectors $v_1, \ldots, v_M$ based on the received downlink reference signals.

(Step S210) With the above-described function of the scheduling unit 190, the base station 100 selects, based on the implicit CSI fed back from the terminals $200_1, \ldots, 200_U$, a predetermined number of terminals (the terminals $200_2$ and $200_U$ in this example) to which data is transmitted. For example, the base station 100 selects the predetermined number of terminals in descending order of the received power values of the downlink reference signals. Note that the base station 100 may select terminals with high orthogonality as in the case of FIG. 20 above. The base station 100 also identifies the analog beamforming vectors $v_2$ and $v_M$ corresponding to the maximum received power of the selected terminals $200_2$ and $200_U$.

(Steps S211 and S212) With the above-described function of the reference signal allocating unit 188, the base station 100 allocates wireless resources to be used by the selected terminals $200_2$ and $200_U$ to transmit uplink reference signals. Then, the base station 100 transmits, to the terminals $200_2$ and $200_U$, downlink control signals including information on the allocated wireless resources and requesting transmission of the uplink reference signals.

(Steps S213 and S214) The terminal $200_2$ extracts the wireless resource information from the downlink control signal received from the base station 100, and transmits uplink reference signals to the base station 100 using the wireless resources allocated to the terminal $200_2$. In like fashion, the terminal $200_U$ extracts the wireless resource information from the downlink control signal received from the base station 100, and transmits uplink reference signals to the base station 100 using the wireless resources allocated to the terminal $200_U$.

Note that the terminals $200_2$ and $200_U$ individually transmit the uplink reference signal K times. On the other hand, in receiving the $q^{th}$ uplink reference signals (q=1, . . . , K), the base station 100 implements reception beamforming for the uplink reference signals using the analog beamforming matrix $W_q$ with a combination of the analog beamforming vectors $\{w_{2q}, w_{Mq}\}$ as its elements.

(Step S215) With the above-described function of the channel estimating unit 189, the base station 100 performs explicit CSI estimation based on uplink reference signals received with the application of analog beamforming matrices $W_1, \ldots, W_K$. The base station 100 determines, based on the estimated explicit CSI, the analog beamforming matrix W that improves the throughput for the terminals $200_2$ and $200_U$.

For example, the base station 100 determines the analog beamforming matrix W in such a manner as to increase the received power values of the individual terminals $200_2$ and $200_U$ selected in step S210 or decrease interference between the terminals $200_2$ and $200_U$. After the completion of step S215, the processing series illustrated in FIG. 22 ends. Modification #1 has been described thus far.

(Modification #2: Distributed Arrangement of RRHs)

The above description is based on the beam search method for searching beams formed by the single base station 100 at a single point. The technology of the second embodiment above is also applicable to a wireless communication system (Modification #2) where remote radio heads (RRHs) are geographically distributed and beams are formed at multiple points.

Figure 23:
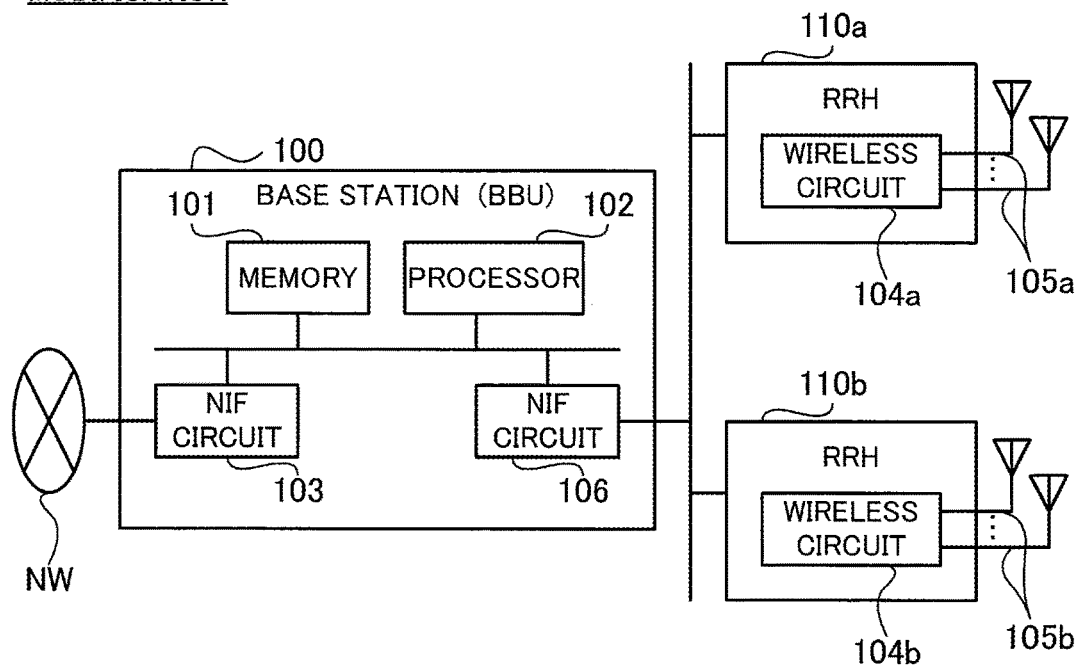
FIG. 23 is a block diagram illustrating an example of hardware capable of implementing functions of a base station according to a modification of the second embodiment.

The base station 100 according to Modification #2 is, for example, one illustrated in FIG. 23. Note that, in the example of FIG. 23, a base-band unit (BBU) for processing baseband signals is associated with the base station 100 for the purpose of illustration; however, the applicable scope of the technology according to the second embodiment is not limited to this example. FIG. 23 is a block diagram illustrating an example of hardware capable of implementing functions of the base station according to a modification of the second embodiment.

FIG. 23 illustrates the base station 100 serving as a BBU, and RRHs 110a and 110b. The base station 100 and the RRHs 110a and 110b are connected to each other via a wired network. Therefore, the base station 100 is equipped with a NIF circuit 106 used to connect with the RRHs 110a and 110b via the network.

The RRH 110a includes a wireless circuit 104a and an antenna group 105a. In like fashion, the RRH 110b includes a wireless circuit 104b and an antenna group 105b. The wireless circuits 104a and 104b correspond to the above-described wireless circuit 104. In addition, the antenna groups 105a and 105b correspond to the antenna group 105. The RRHs 110a and 110b may form individual cells, or may use the antenna groups 105a and 105b, respectively, as distributed antennas.

Figure 24:
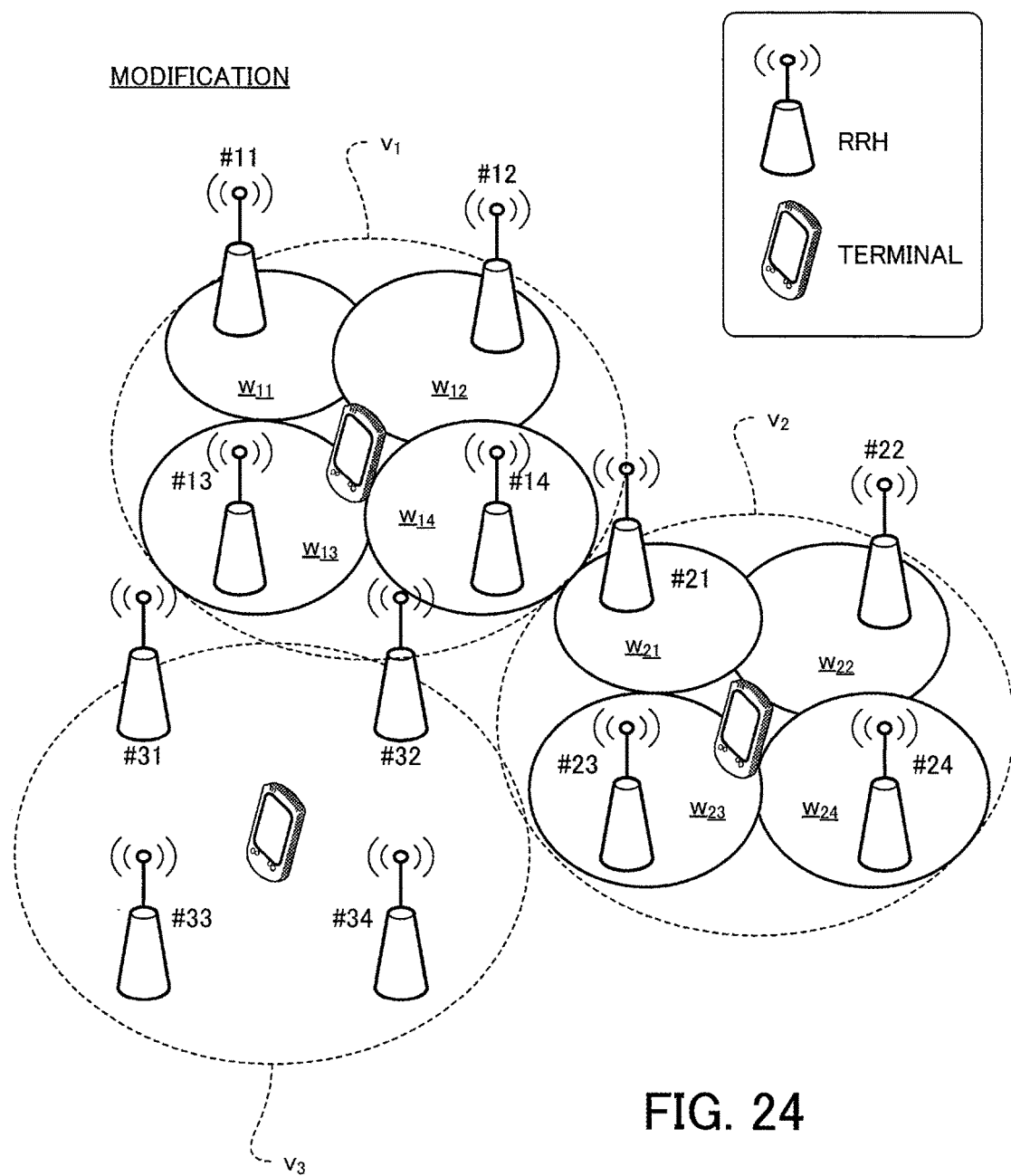
FIG. 24 illustrates a CSI estimation method according to a modification of the second embodiment.

In the example of FIG. 23, two RRHs are connected to one BBU for the purpose of illustration. Now let us describe a CSI estimation method according to Modification #2 with reference to a wireless communication system of FIG. 24, including more RRHs. FIG. 24 illustrates a CSI estimation method according to a modification of the second embodiment.

FIG. 24 illustrates an example of a wireless communication system including twelve RRHs #11, . . . , #34 and three terminals. The following describes an example of a method for applying the above-described CSI estimation architecture to the wireless communication system. Assume here that one RRH group is set for every four RRHs. Specifically, RRHs #11, . . . , #14 are organized into RRH Group #1; RRHs #21, . . . , #24 are organized into RRH Group #2; and RRHs #31, . . . , #34 are organized into RRH Group #3.

In Phase #1, an analog beamforming vector is set in such a manner that an area covered by beams formed by the individual RRHs of each RRH group is limited to the vicinity of the RRH group. In the example of FIG. 24, an analog beamforming vector $v_1$ is set, which defines the cover area of beams formed by RRH Group #1. In addition, analog beamforming vectors $v_2$ and $v_3$ are set, which define the cover areas of beams formed by RRH Groups #2 and #3, respectively.

In Phase #1, downlink reference signals are transmitted using the analog beamforming vectors $v_1$, $v_2$, and $v_3$ and implicit CSI estimation is performed. The base station 100 selects terminals based on the results of the implicit CSI estimation, and then identifies analog beamforming vectors corresponding to the maximum received power values of the selected terminals. In the example of FIG. 24, the analog beamforming vectors $v_1$ and $v_2$ are selected.

In Phase #2, uplink reference signals are transmitted from the selected terminals. In this regard, analog beamforming vectors $w_{11}, \ldots, w_{24}$ are applied when the uplink reference signals are received. These analog beamforming vectors $w_{11}, \ldots, w_{24}$ steer beams formed by RRHs #11, . . . , #24 corresponding to the selected analog beamforming vectors $v_1$ and $v_2$ to even smaller neighboring areas. Then, the base station 100 performs explicit CSI estimation based on the uplink reference signals received from RRHs #11, . . . , #24.

The above-described method controls the beam coverage areas. In Phase #1, beam search is implemented using beams covering large areas. Then, in Phase #2, explicit CSI estimation is performed using beams covering smaller areas. This method allows the technique of the second embodiment above to be applied to a wireless communication system that forms beams at multiple points using a plurality of RRHs. Modification #2 has been described thus far.

(Modification #3: Reference Table)

As for methods for allocating wireless resources (resource allocation) for transmission of uplink reference signals, FIG. 20 illustrates an example where the base station 100 dynamically determines the resource allocation. Note however that, in applying the technique of the second embodiment, the resource allocation method is not limited to this.

Figure 25:
FIG. 25 illustrates an example of a reference table used in a resource allocation method according to a modification of the second embodiment.

One modification of the resource allocation (Modification #3) is, for example, a method for using a reference table that lists predetermined allocation details. FIG. 25 illustrates an example of a reference table used in the resource allocation method according to a modification of the second embodiment. Note that a reference table 201a of FIG. 25 is an example of a reference table according to Modification #3. The reference table 201a is held by the terminals $200_1, \ldots, 200_U$ (stored, for example, in the memory 201).

As illustrated in FIG. 25, the reference table 201a associates combinations of beam numbers and RSRP ranges with wireless resources. The beam numbers are beam numbers of beams corresponding to analog beamforming vectors used by the base station 100 to transmit downlink reference signals in Phase #1. There are, for example, three RSRP ranges based on a RSRP value p: a low range ($p<th_1$); a high range ($p \geq th_2$); and an intermediate range ($th_1 \leq p < th_2$). $th_1$ and $th_2$ denote thresholds set in advance to specify the RSRP ranges.

In the case of using the reference table 201a, the base station 100 selects terminals in Phase #1 and then requests the selected terminals for transmission of uplink reference signals. In this regard, the base station 100 need not notify the terminals of details of wireless resource allocation. The selected terminals refer to the reference table 201a and identify, based on RSRP obtained from implicit CSI estimation, wireless resources to be used for transmission of uplink reference signals.

Assume for example that the terminals $200_2$ and $200_U$ are selected and the beam numbers corresponding to the maximum received power values of downlink reference signals individually detected at the terminals $200_2$ and $200_U$ are 2 and M. Assume also that the RSRP value p at the terminal $200_2$ is greater than or equal to $th_1$ but less than $th_2$ and the RSRP value p at the terminal $200_U$ is greater than or equal to $th_2$.

In this case, the terminal $200_2$ identifies wireless resource Res#E from the reference table 201a, and then transmits uplink reference signals using Res#E. On the other hand, the terminal $200_U$ identifies wireless resource Res#C from the reference table 201a, and then transmits uplink reference signals using Res#C. The use of the reference table 201a eliminates the need for the base station 100 to notify the terminals of resource allocation details, thus contributing to an improvement in communication efficiency and a reduction in processing load. Modification #3 has been described thus far.

(Another Modification)

In addition to the above modifications, the following modification is also possible. The above description is based on an example where each terminal has a single antenna; however, if being equipped with a plurality of antennas, each terminal is able to apply an analog beamforming vector. For example, when, in Phase #1, the base station is transmitting downlink reference signals with the application of analog beamforming vectors, each terminal may implement reception beamforming to select an analog beamforming vector (corresponding to a reception weight) maximizing the received power. In this case, in transmitting a feedback signal and uplink reference signals, transmission beamforming may be implemented using the analog beamforming vector selected by each terminal. In addition, in receiving a data signal, reception beamforming may be implemented using the analog beamforming vector selected by each terminal. The second embodiment has been described thus far.

It is possible to reduce communication load involved in determining precoding used for data transmission.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A wireless base station comprising:
a memory configured to store information on a plurality of different first precodings and information on a plurality of different reception weights; and
a controller configured to:
transmit, from a plurality of antennas, a plurality of downlink reference signals, each of which is obtained by applying one of the plurality of first precodings,
receive information on reception quality of the plurality of downlink reference signals from a plurality of wireless terminals,
select, based on the information on reception quality, at least one wireless terminal amongst the plurality of wireless terminals,
determine wireless resource allocation for allowing the at least one wireless terminal to transmit an uplink reference signal,
notify the at least one wireless terminal of the wireless resource allocation, and
receive the uplink reference signal transmitted from the at least one wireless terminal by applying each of the plurality of reception weights to the uplink reference signal,
wherein:
the plurality of first precodings individually steers transmission power orientations different from each other,
the plurality of reception weights individually steers reception sensitivity orientations different from each other, and
distribution of orientation directions corresponding to the plurality of reception weights is set denser than distribution of orientation directions corresponding to the plurality of first precodings.

2. The wireless base station according to claim 1, wherein:
the wireless base station and the plurality of wireless terminals communicate with each other employing time division duplex, and
the controller selects, amongst the plurality of reception weights, at least one reception weight based on reception quality of a plurality of received signals obtained by applying each of the plurality of reception weights to the uplink reference signal, and applies the at least one reception weight as a second precoding at time of data transmission.

3. The wireless base station according to claim 1, wherein:
the plurality of wireless terminals is a set of wireless terminals located in predetermined ranges within an area covered by the wireless base station and a neighboring area adjacent to the area.

4. The wireless base station according to claim 2, wherein:
the controller:
   generates information on wireless channels based on the at least one reception weight and a set of received signals obtained by applying the at least one reception weight to the uplink reference signal,
   generates, based on the information on wireless channels, a third precoding for reducing interference among data streams, and
   applies the second precoding and the third precoding at the time of data transmission.

5. A wireless communication system comprising:
a wireless base station; and
a plurality of wireless terminal,
wherein the wireless base station includes:
   a memory configured to store information on a plurality of different precodings and information on a plurality of different reception weights, and
   a controller configured to:
      transmit a plurality of downlink reference signals, each of which is obtained by applying one of the precodings,
      receive information on reception quality of the plurality of downlink reference signals from the plurality of wireless terminals,
      select, based on the information on reception quality, at least one wireless terminal amongst the plurality of wireless terminals,
      determine wireless resource allocation for allowing the at least one wireless terminal to transmit an uplink reference signal,
      notify the at least one wireless terminal of the wireless resource allocation, and
      receive the uplink reference signal transmitted from the at least one wireless terminal by applying each of the plurality of reception weights to the uplink reference signal, and wherein each of the plurality of wireless terminals includes a transmitter/receiver configured to receive the plurality of downlink reference signals, transmit the information on reception quality to the wireless base station, and transmit the uplink reference signal to the wireless base station based on the wireless resource allocation notified by the wireless base station, wherein:

the plurality of precodings individually steers transmission power orientations different from each other, the plurality of reception weights individually steers reception sensitivity orientations different from each other, and distribution of orientation directions corresponding to the plurality of reception weights is set denser than distribution of orientation directions corresponding to the plurality of precodings.

* * * * *